United States Patent
Gunnarsson et al.

(10) Patent No.: US 11,785,619 B2
(45) Date of Patent: *Oct. 10, 2023

(54) RADIO NETWORK NODE, A WIRELESS DEVICE AND METHODS THEREIN FOR TRANSMISSION AND RECEPTION OF POSITIONING SYSTEM INFORMATION

(71) Applicant: Telefonaktiebolaget LM Ericsson (publ), Stockholm (SE)

(72) Inventors: Fredrik Gunnarsson, Linköping (SE); Åke Busin, Sollentuna (SE); Tao Cui, Upplands Väsby (SE); Sara Modarres Razavi, Linköping (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,462

(22) Filed: Jul. 13, 2022

(65) Prior Publication Data

US 2022/0386274 A1    Dec. 1, 2022

Related U.S. Application Data

(63) Continuation of application No. 16/468,481, filed as application No. PCT/SE2019/050337 on Apr. 12, 2019, now Pat. No. 11,425,685.

(Continued)

(51) Int. Cl.
*H04W 72/12* (2023.01)
*H04W 72/30* (2023.01)
(Continued)

(52) U.S. Cl.
CPC .......... *H04W 72/30* (2023.01); *G01S 5/0236* (2013.01); *H04W 12/037* (2021.01); *H04W 72/1263* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2009/0061851 A1 | 3/2009 | Kitazoe | |
| 2010/0183031 A1* | 7/2010 | Dalsgaard | H04W 28/06 370/474 |

(Continued)

FOREIGN PATENT DOCUMENTS

| | | |
|---|---|---|
| CN | 101690012 A | 3/2010 |
| CN | 102598538 A | 7/2012 |

(Continued)

OTHER PUBLICATIONS

Notice of Allowance dated Oct. 14, 2022 for Japanese Patent Application No. 2020-549739, 4 pages.

(Continued)

*Primary Examiner* — Kodzovi Acolatse
(74) *Attorney, Agent, or Firm* — SAGE PATENT GROUP

(57) ABSTRACT

A wireless device and a method therein for receiving positioning system information from a radio network node. The wireless device and the radio network node operate in a wireless communications network. The wireless device receives positioning system information broadcast scheduling information comprising information about positioning System Information Blocks that are comprised in a System Information message. Further, the wireless device receives an indication that a pSIB is segmented into pSIB segments. Based on the indication and on the pSI the wireless device determines whether or not the pSIB segments are scheduled via contiguous scheduling. When the pSIB segments are determined to be scheduled via contiguous scheduling, the wireless device monitors scheduled resources, retrieves the (Continued)

contiguously scheduled pSIB segments and decodes position system information of the retrieved pSIB segments.

30 Claims, 15 Drawing Sheets

Related U.S. Application Data

(60) Provisional application No. 62/658,628, filed on Apr. 17, 2018.

(51) Int. Cl.
*H04W 12/037* (2021.01)
*G01S 5/02* (2010.01)
*H04W 72/1263* (2023.01)
*H04W 72/51* (2023.01)

(56) References Cited

U.S. PATENT DOCUMENTS

| | | |
|---|---|---|
| 2010/0202382 A1 | 8/2010 | Park et al. |
| 2010/0232362 A1 | 9/2010 | Tenny |
| 2011/0026503 A1 | 2/2011 | Mueck et al. |
| 2011/0263250 A1 | 10/2011 | Mueck et al. |
| 2011/0320856 A1* | 12/2011 | Deivasigamani ..... H04L 1/0053 714/2 |
| 2014/0112180 A1 | 4/2014 | Axmon et al. |
| 2015/0365790 A1 | 12/2015 | Edge et al. |
| 2015/0382284 A1* | 12/2015 | Brismar ............. H04W 28/085 370/329 |
| 2018/0324740 A1* | 11/2018 | Edge .................... G01S 5/0236 |
| 2019/0104332 A1 | 4/2019 | Hirabayashi et al. |
| 2019/0182665 A1* | 6/2019 | Edge .................... H04W 74/08 |
| 2019/0246337 A1* | 8/2019 | Viorel .................. H04W 72/04 |
| 2020/0068348 A1* | 2/2020 | Li ........................ G01S 19/04 |
| 2021/0337508 A1* | 10/2021 | Gunnarsson ......... H04W 48/12 |
| 2022/0353794 A1* | 11/2022 | Shrestha ............. H04W 76/28 |

FOREIGN PATENT DOCUMENTS

| | | |
|---|---|---|
| CN | 103765927 A | 4/2014 |
| CN | 104349420 A | 2/2015 |
| CN | 104956759 A | 9/2015 |
| CN | 106415300 A | 2/2017 |
| CN | 107105403 A | 8/2017 |
| JP | 2014-529968 A | 11/2014 |
| JP | 2017-525195 A | 8/2017 |
| RU | 2588042 C2 | 6/2016 |
| WO | 2009001288 A2 | 12/2008 |
| WO | 2011126420 A1 | 10/2011 |
| WO | 2012/047141 A1 | 4/2012 |
| WO | 2012/177203 A1 | 12/2012 |
| WO | 2013033464 A2 | 3/2013 |
| WO | 2015160705 A2 | 10/2015 |
| WO | 2015192113 A1 | 12/2015 |
| WO | 2017167148 A1 | 10/2017 |
| WO | 2018034475 A1 | 2/2018 |

OTHER PUBLICATIONS

Ericsson; "On Positioning SIB Scheduling"; 3GPP TSG-RAN WG2 #102, R2-1808113; Busan, Korea; May 21-25, 2018; 7 pages.
International Search Report and Written Opinion of the International Searching Authority, PCT/SE2019/050337, dated Jul. 12, 2019, 25 pages.
Ericsson: "Positioning assistance data segmentation and grouping", 3GPP TSG-RAN WG2 #101bis, Sanya, China, Apr. 16-20, 2018, R2-1805255, XP51428931, 7 Pages.
Ericsson: "Positioning assistance data segmentation and grouping", 3GPP TSG-RAN WG2 #101bis, Sanya, China, Apr. 16-20, 2018, R2-1805257, XP51415947, 5 Pages.
Office Action dated Apr. 27, 2021 for Russian Patent Application No. 2020137098/07 (068414), 16 pages (includes English translation).
Office Action dated Nov. 23, 2021 for Chinese Patent Application No. 201980026601.0, 10 pages.
Ericsson; "Introduction of Scheduling Block for SIBs"; 3GPP TSG-RAN Working Group 2 (Radio layer 2 and Radio layer 3); R2-002057; Beijing, PR China, Oct. 9-13, 2000; 38 pages.
3GPP TS 36.331, V15.1.0, 3rd Generation Partnership Project; Technical Specification Group Radio Access Network Evolved Universal Terrestrial Radio Access (E-UTRA); Radio Resource Control (RRC); Protocol Specification (Release 15); Mar. 2018, 786 pages.
Nokia et al., "UE Positioning Accuracy Enhancements for Lte", RP-170813, 3GPP TSG RAN Meeting #75, Dubrovnik, Croatia, Mar. 6-9, 2017, Agenda Item 10.1.1, 4 pages.
Second Office Action dated Aug. 26, 2022 for Chinese Patent Application No. 201980026601.0, 10 pages.
Office Action dated Jan. 18, 2023 for Chinese Patent Application No. 201980026601.0, 8 pages.
3GPP TSG-RAN WG2 #93; "Addition of Low Complexity UEs and Coverage Enhancement Features"; 36.331 CR2003 13.0.0; R2-161086; Malta; Feb. 15-19, 2016; 314 pages.

* cited by examiner

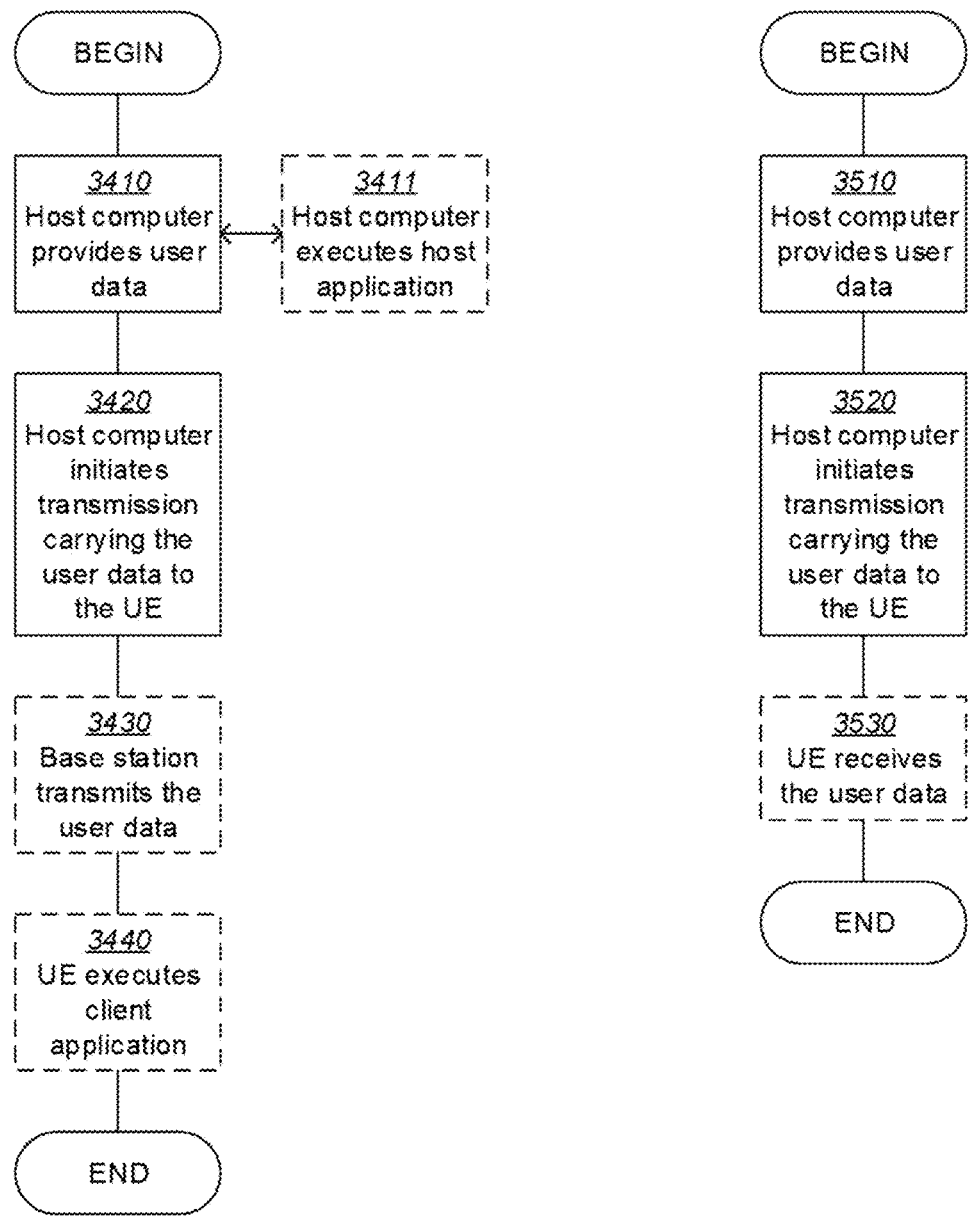

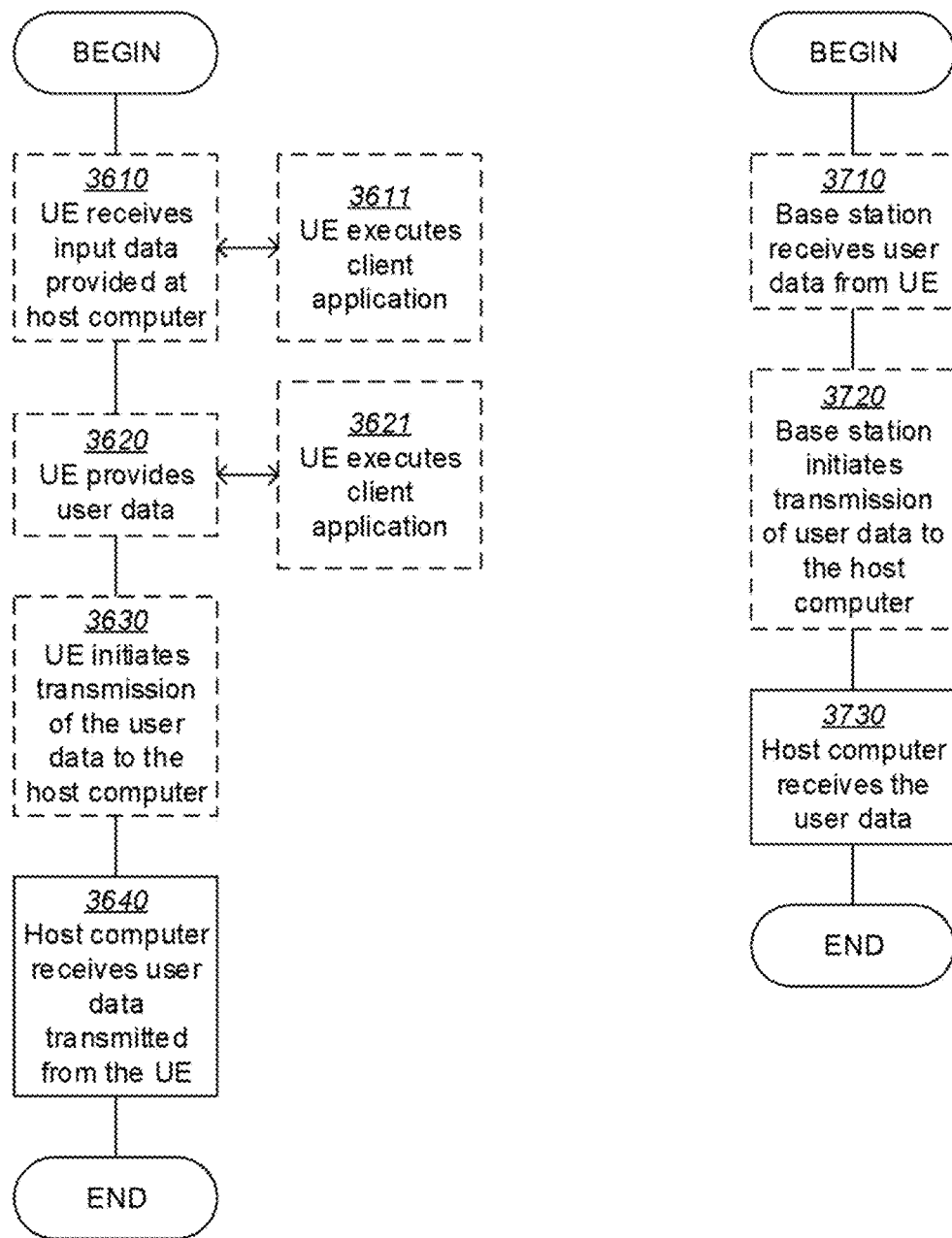

RADIO NETWORK NODE, A WIRELESS DEVICE AND METHODS THEREIN FOR TRANSMISSION AND RECEPTION OF POSITIONING SYSTEM INFORMATION

CROSS REFERENCE TO RELATED APPLICATIONS

This application is a continuation of U.S. patent application Ser. No. 16/468,481, filed on Jun. 11, 2019, which is a 35 U.S.C. § 371 national stage application of PCT International Application No. PCT/SE2019/050337 filed on Apr. 12, 2019, which in turn claims domestic priority to U.S. Provisional Patent Application No. 62/658,628, filed on Apr. 17, 2018, the disclosures and content of which are incorporated by reference herein in their entirety.

TECHNICAL FIELD

Embodiments herein relate to a radio network node, a wireless device and to methods therein. Especially, embodiments relate to transmission and reception of positioning system information.

BACKGROUND

In a typical wireless communication network, wireless devices, also known as wireless communication devices, mobile stations, stations (STA) and/or User Equipments (UES), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Positioning in an LTE communications network is supported by the architecture schematically illustrated in FIG. 1, with direct interactions between a UE and a location server, e.g. an Enhanced Serving Mobile Location Center (E-SMLC), via the LTE Positioning Protocol (LPP). Moreover, there are also interactions between the location server and an eNodeB via the LPPa protocol, to some extent supported by interactions between the eNodeB and the UE via the Radio Resource Control (RRC) protocol.

UE positioning is recognized as an important feature for LTE networks due to its potential for massive commercial applications (for example intelligent transportation, entertainment, industry automation, robotics, remote operation, healthcare, smart parking and so on) as well as its relevance to US FCC E911 requirements.

LTE networks have support for a wide range of positioning methods. The Global Navigation Satellites System (GNSS) is one of the widely used positioning methods and is a collective term for many different satellite systems, with the Global Positioning System (GPS) being the most commonly supported by devices, GLONASS, Galileo, BeiDou, and QZSS are other examples. Furthermore, satellite systems can also be used to provide augmentation data to the UE, commonly referred to as Satellite Based Augmentation Systems (SBAS).

Recent enhancements in GNSS technology include support for very precise positioning, where the device, e.g. the UE, can interact with a network node to obtain specific measurement correction information. Much of these are captured by the specification work of Radio Technical Commission for Maritime services (RTCM). One example is Real Time Kinematic (RTK) GNSS, which is a differential GNSS positioning technology enabling positioning accuracy improvement from meter level to decimeter or even centimeter level in the right conditions in real-time by exploiting carrier phase measurements of the GNSS signal from individual satellites, rather than only the code phase, together with assistance data based on information from one or more reference stations. Support for RTK GNSS in LTE networks should therefore be provided and are under standardization in the Release 15 work item. The support for UE-based GNSS RTK in LTE networks comprises reporting RTK assistance data to the UE. The assistance data can also encompass other kinds of positioning assistance data, such as more general assisted GNSS, OTDOA information, etc.

Two options for providing positioning assistance data to the UE are being standardized. The first option is to broadcast the positioning assistance data from base stations by extending the system information with positioning system information, i.e. with the positioning assistance data. The second option is to send the positioning assistance data to each UE individually via unicast, for example via the LPP. In addition, the UE can also interact with an RTK server over the application layer directly, as another example of unicast.

For the first option, i.e. the broadcast option, the positioning assistance data can be separated into different positioning assistance data elements, The Network Node (NN), e.g. the location server, such as an E-SMLC in LTE, a Location Management Function (LMF) in 5G, etc., prepares the positioning assistance data elements, encodes them separately and optionally encrypts them individually and sends them to the base station. The base station takes the positioning assistance data elements and compiles positioning System Information Blocks (pSIB). One or more pSIBs can be broadcasted by the base station in an SI message. If the pSIB is too large to fit into a single SI message, it can be segmented, at the base station (octet string segmentation). Alternatively, the network node (NN), can segment the positioning assistance data elements into multiple segments before sending to the base station for broadcast. These segments may be decoded individually (pseudo segmentation) or needs to be concatenated before they may be decoded (octet string segmentation). In that case, the segments are mapped to the same pSIB type, but indicated as different segments.

In other words, the positioning assistance data element is what the network node, e.g. the E-SMLC, provides. The positioning assistance data may be RTK data, but may be other GNSS data or OTDOA data, or something else. The network node, e.g. the E-SMLC, sends the positioning assistance data elements to the base station. Based on the received positioning assistance data, the base station compiles pSIBs that are sent in SI messages to the UE.

In current system information broadcast, the scheduling information is also broadcasted. For each SIB, the base station configures an SI periodicity, while the SI window is the same for all SIBs. The device, e.g. the UE, retrieves an SI identifier which is used to identify a SIB among the transmitted data blocks within the SI window.

The current state of the art for positioning information broadcast is to configure an SI window and an SI periodicity. In case a SIB is too large (only applicable for SIB 12 of LTE for the CMAS warnings), the SIB will be segmented, and each segment will be sent in separate SI periods, scheduled in separate SI windows, separated in time by about the SI periodicity.

One objective for the LTE Re115 accurate positioning work item is to specify a new SIB to support broadcast of Assistance Data (AD):
  Broadcasting of assistance data [RAN2, RAN3, SA3, SA2]
  Specify a new SIB to support signalling of positioning assistance information for A-GNSS, RTK and UE-based OTDOA assistance information.
  Specify optional encryption procedure for broadcast assistance data, including mechanism for delivery of UE-specific encryption keys.

SUMMARY

As a part of developing embodiments herein a problem will first be identified and discussed.

Latency, i.e. the delay between when the positioning assistance data element was compiled in a network node NN to when a wireless device, e.g. a UE, has retrieved enough information to decode the pSIBs and retrieved the positioning assistance data element, is a critical factor for UEs, e.g. wireless devices, when acquiring the positioning assistance data. If there is delay in sending or receiving the data, the UE may not precisely determine its position. In many use cases precise positioning is a requirement. Examples of such use cases are applications in autonomous vehicles and other robotic applications. Using todays legacy scheme to transmit the pSIB may incur huge latency, since all segments needs to be obtained in case of octet string segmentation before the information can be decrypted (optionally) and decoded, and with only one segment per SI period (order of seconds), the delay may be considerable.

An object of embodiments herein is therefore to improve the performance of a wireless communications network for transmission and reception of positioning SIB to minimize the latency.

According to an aspect of embodiments herein, the object is achieved by a method performed by a wireless device for receiving positioning system information from a Radio Network Node (RNN). The wireless device and the RNN operate in a wireless communications network.

The wireless device receives, from the RNN, positioning system information broadcast scheduling information (pSI) comprising information about positioning System Information Blocks (pSIBs) that are comprised in a System Information, SI, message.

Further, the wireless device receives, from the RNN, an indication that a pSIB is segmented into pSIB segments.

The wireless device determines based on the indication and on the pSI whether or not the pSIB segments are scheduled via contiguous scheduling.

When the pSIB segments are determined to be scheduled via contiguous scheduling, the wireless device monitors scheduled resources and retrieves the contiguously scheduled pSIB segments.

The wireless device decodes position system information of the retrieved pSIB segments.

According to another aspect of embodiments herein, the object is achieved by a wireless device for receiving positioning system information from a Radio Network Node (RNN). The wireless device and the RNN are configured to operate in a wireless communications network.

The wireless device is configured to receive, from the RNN, positioning system information broadcast scheduling information (pSI) comprising information about positioning System Information Blocks (pSIBs) that are comprised in a System Information, SI, message.

Further, the wireless device is configured to receive, from the RNN, an indication that a pSIB is segmented into pSIB segments.

The wireless device is configured to determine based on the indication and on the pSI whether or not the pSIB segments are scheduled via contiguous scheduling.

The wireless device is configured to monitor scheduled resources and retrieves the contiguously scheduled pSIB segments, when the pSIB segments are determined to be scheduled via contiguous scheduling.

The wireless device is configured to decode position system information of the retrieved pSIB segments.

According to another aspect of embodiments herein, the object is achieved by a method performed by a Radio Network Node (RNN) for transmitting positioning system information to a wireless device. The RNN and the wireless device operate in a wireless communications network.

The RNN determines that positioning assistance data elements will be mapped to positioning System Information Blocks (pSIBs) needed to be separated into multiple segments.

The RNN broadcasts positioning system information broadcast scheduling information (pSI) comprising information about pSIBs being comprised in a SI message.

Further the RNN broadcasts an indication that a pSIB is segmented into pSIB segments.

Furthermore, the RNN schedules and broadcasts the pSIB segments via contiguous scheduling.

According to another aspect of embodiments herein, the object is achieved by a Radio Network Node (RNN) for transmitting positioning system information to a wireless device. The RNN and the wireless device are configured to operate in a wireless communications network.

The RNN is configured to determine that positioning assistance data elements will be mapped to positioning System Information Blocks (pSIBs) needed to be separated into multiple segments.

The RNN is configured to broadcast positioning system information broadcast scheduling information (pSI) comprising information about pSIBs being comprised in a SI message.

Further the RNN is configured to broadcast an indication that a pSIB is segmented into pSIB segments.

Furthermore, the RNN is configured to schedule and broadcast the pSIB segments via contiguous scheduling.

According to another aspect of embodiments herein, the object is achieved by a method performed by a network node for assist a Radio Network Node (RNN) in transmitting positioning system information to a wireless device. The network node, the RNN and the wireless device operate in a wireless communications network.

The network node prepares positioning System Information Blocks (pSIBs) and provides the pSIBs to the RNN.

According to another aspect of embodiments herein, the object is achieved by a network node for assist a Radio Network Node (RNN) in transmitting positioning system information to a wireless device. The network node, the RNN and the wireless device are configured operate in a wireless communications network.

The network node is configured to prepare positioning System Information Blocks (pSIBs) and to provide the pSIBs to the RNN.

Some advantages of embodiments disclosed herein are that the pSIB segments may be broadcasted and retrieved by the target device, e.g. the wireless device, with short latency since they are broadcasted via contiguous scheduling.

BRIEF DESCRIPTION OF THE DRAWINGS

Examples of embodiments herein are described in more detail with reference to attached drawings in which:

FIGS. 15-18 are flowcharts illustrating methods implemented in a communication system including a host computer, a base station and a user equipment.

DETAILED DESCRIPTION

Embodiments herein may refer to GNSS, RTK, Positioning, SIBs.

According to some embodiments disclosed herein, positioning SIBs (pSIBs) are assumed to be associated to a specific positioning system information scheduling information (pSI). The positioning system information scheduling information pSI is essentially a list of which pSIBs that are included in what SI message. Further, a dedicated behavior is designed for the handling, scheduling and reception of the pSIBs.

In particular, the behavior of a wireless device depends on a pSIB segmentation indication in the pSI. Based on the pSIB segmentation indication the wireless device determines that a contiguous scheduling is considered for the pSIB segments. The segment indication may be general for all pSIBs or per pSIB type.

Figure 1:
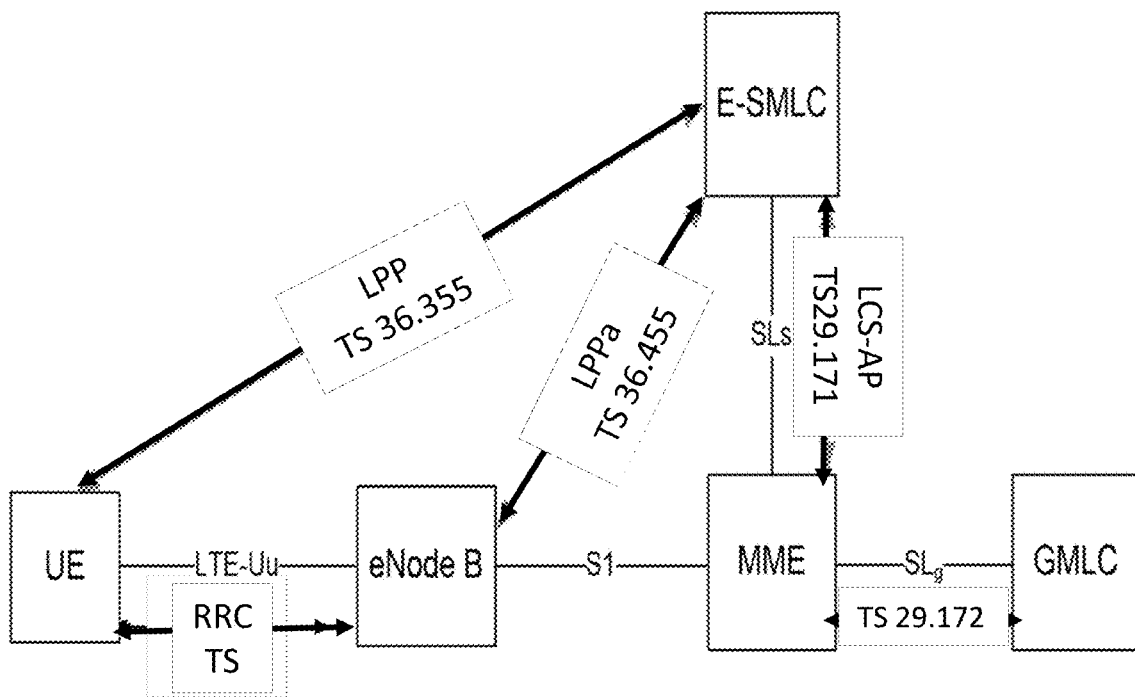
FIG. 1 is a schematic block diagram illustrating an LTE communications network supporting positioning according to prior art.
Figure 2:
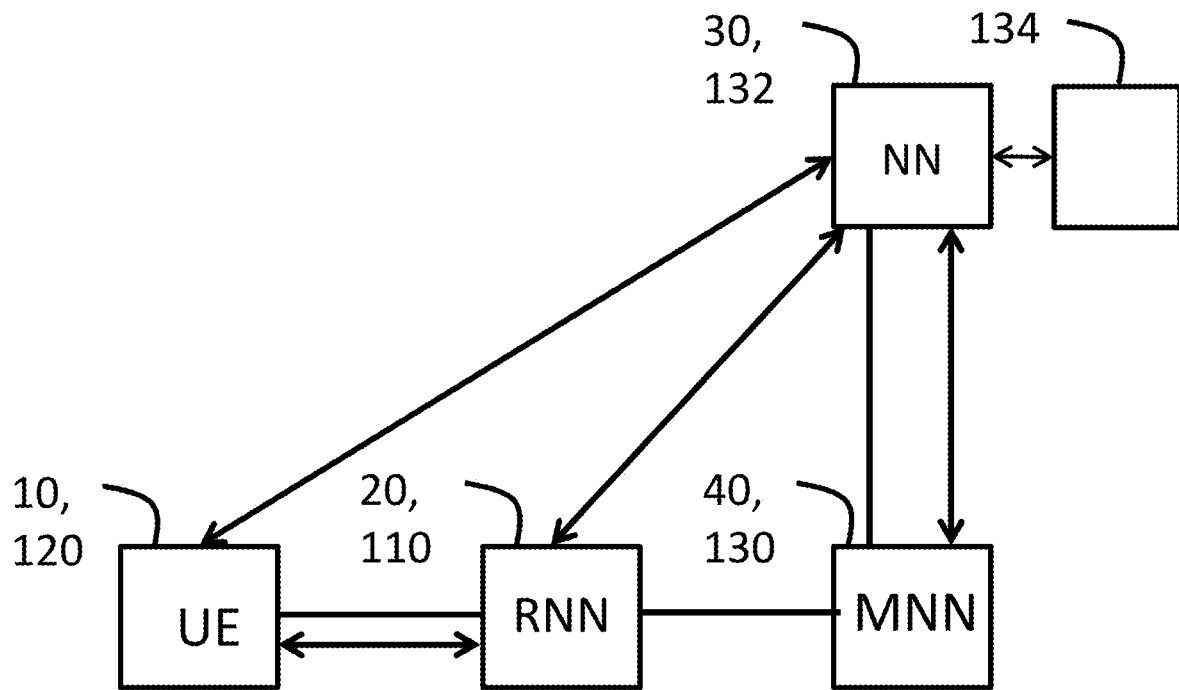
FIG. 2 is a schematic block diagram illustrating embodiments of a wireless communications network.

FIG. 2 schematically illustrates logical entities of a wireless communications network in more general terms. A target device or a UE 10,120 is the entity performing the positioning measurements supported by the positioning assistance data elements broadcasted as pSIBs in SI messages by a Radio Network Node (RNN), typically a radio base station 20,110 but in even more general terms a transmission point, radio head, cell eNB, gNB etc. The broadcasted information is prepared by a Network Node (NN) 30,132, which may be a location server, an E-SMLC, an LMF, etc. Optionally, the positioning assistance data for broadcast may be ciphered, e.g. encrypted, at the NN 30,132, in which case, decryption/deciphering keys are sent from the NN 30,132 to a Mobility Network Node (MNN) 40,130. The MNN 40,130 may be the MME in the EPC or the AMF in the 5G core, or some other core network node. In case of encrypted data, the UE 10,120 obtains the decryption/deciphering keys from the MNN 40,130.

Embodiments herein are mostly exemplified with LTE wireless devices but it may be applicable to other wireless devices which are served by other Radio Access Technologies such as CAT-M, NB-IoT, WiFi, or NR Carriers.

Figure 3:
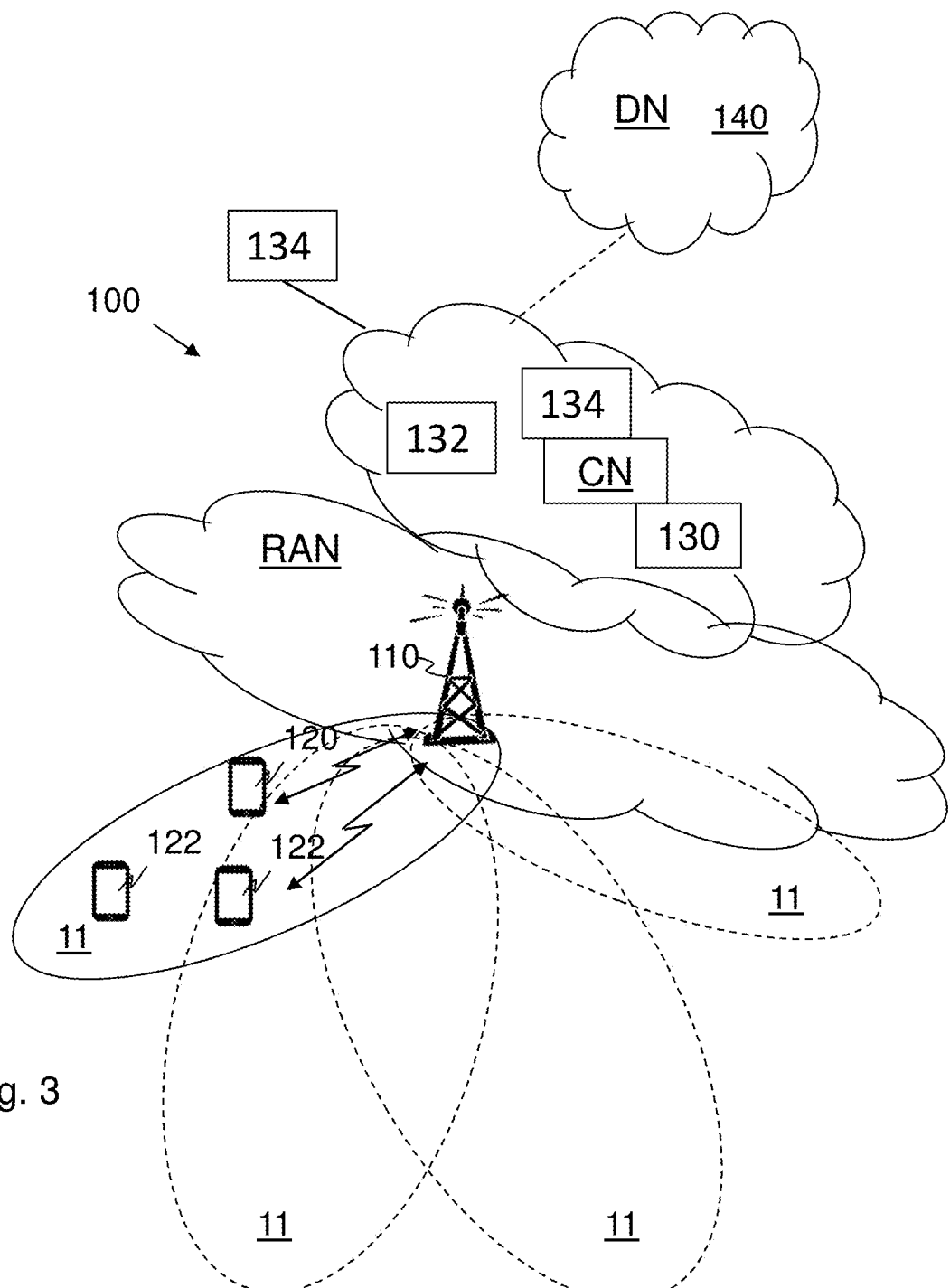
FIG. 3 is a schematic block diagram illustrating embodiments of a wireless communications network.

Embodiments herein relate to wireless communication networks in general. FIG. 3 is a schematic overview depicting a wireless communications network 100. The wireless communications network 100 may be referred to as a radio communications network. The wireless communications network 100 comprises one or more Radio Access Networks (RANs) and one or more Core Networks (CNs). The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 100 is referred to as just a network.

In the wireless communication network 100, wireless devices e.g. a wireless device 10,120 also referred to as the first UE 120, is operating in the wireless communications network 100. One or more further wireless devices 122 also referred to as one or more second UEs 122 may operate in the wireless communications network 100. As schematically illustrated in FIG. 3, the wireless device 120,122 may communicate with a network node, e.g. a network node 110 which will be described below.

The wireless devices 120, 122 may each e.g. be a mobile station, a non-Access Point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Network nodes operate in the radio communications network 100, such as a Radio Network Node (RNN) 20,110 also referred to as the first network node 110, providing radio coverage over one or more geographical areas, one or more service areas 11, which may also be referred to as cells, beams or beam groups of a first Radio Access Technology (RAT), such as 5G, LTE, Wi-Fi, NB-IoT, CAT-M, Wi-Fi, eMTC or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the radio access technology and terminology used. The network node 110 may be referred to as a serving radio network node and communicates with the wireless device 120, 122 with Downlink (DL) transmissions to the wireless device 120, 122 and Uplink (UL) transmissions from the wireless device 120, 122.

Further network nodes operate in the radio communications network 100, such as a Mobility Network Node (MNN) 40,130 also referred to as the second network node 130. The network node 130 may be an MME which is a control node for an LTE access network, a Serving Gateway (SGW), and a Packet Data Network Gateway (PGW). An MME is amongst other responsible for tracking and paging procedure including retransmissions. Further, the network node 130 may be an Operation And Maintenance (OAM) node such as an Operation and Support System Radio and Core (OSS-RC) node or an Ericsson Network Management (ENM) node.

Further network nodes such as a location server 30, 132 and a positioning server 134 operate in the radio communications network 100. For example, the location server 30,132 may be an E-SMLC and the positioning server 134 may be an RTK server. The location server 132 and the positioning server 134 may communication with each other over a communications interface.

It should be understood that the positioning server 134 may be arranged external of the radio communications network 100 and in such a scenario the positioning server 134 may be referred to as an external positioning server 132 and the location server 132 and the positioning server 134 may communicate over an IP interface.

The positioning server 134 may sometimes herein be referred to as an RTK server or an RTK network provider.

Methods according to embodiments herein may be performed by any of the network node 110 such as e.g. an eNB, the wireless device 120, e.g. the UE, the mobility network node 130, the location server 132 and/or by the positioning server 134. As an alternative, a Distributed Node (DN) and functionality, e.g. comprised in a cloud 140 as shown in FIG. 3 may be used for performing or partly performing the methods.

Actions of Some Embodiments Herein

Figure 4:
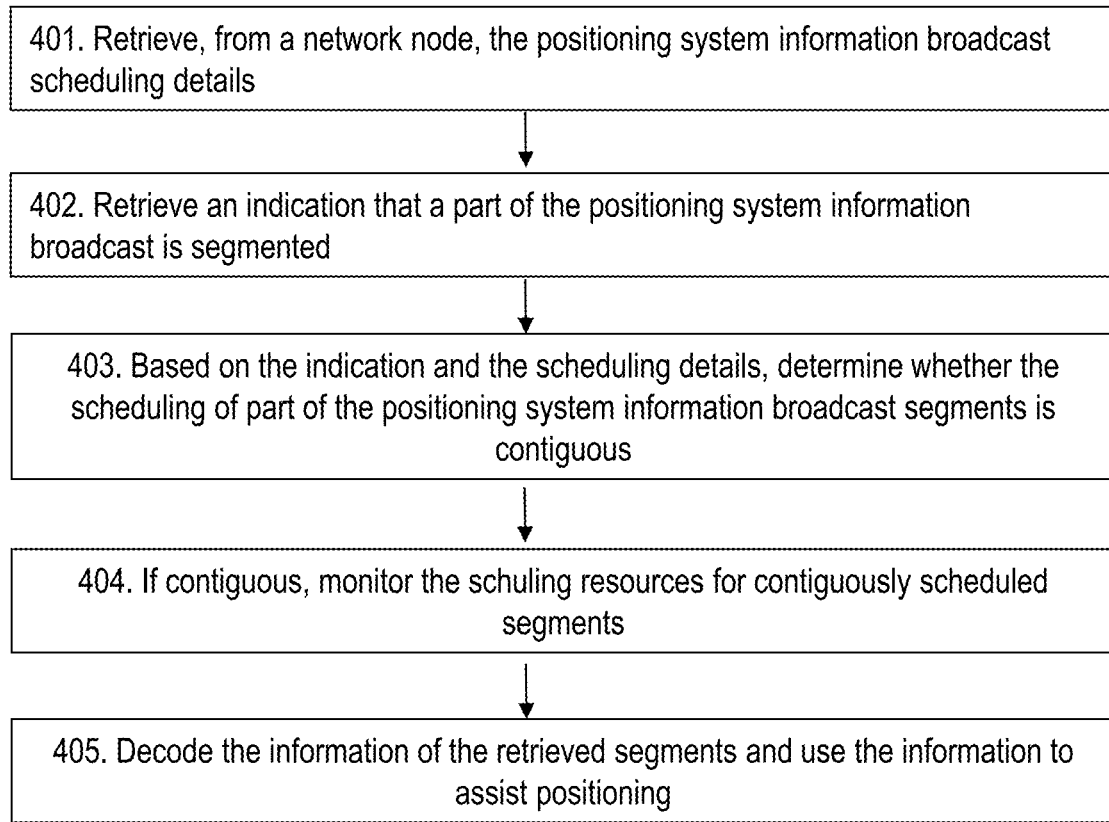
FIG. 4 is a flowchart depicting embodiments of a method in a wireless device.

Example embodiments of a flowchart depicting embodiments of a method performed by the wireless device 10,120, e.g. to receive positioning system information, i.e. to receive positioning assistance data, is depicted in FIG. 4 and will be described more in detail in the following. As previously mentioned, the wireless device 10,120 and the RNN 20,110 operate in the wireless communications network 100. The method may comprise one or more of the following actions which actions may be taken in any suitable order. Further, it should be understood that one or more actions may be optional and that actions may be combined.

In Action 401, the wireless device 10,120 retrieves or receives positioning system information broadcast scheduling details pSI from the RNN 20,110. The positioning system information broadcast scheduling details pSI is sometimes herein referred to as positioning system information broadcast scheduling information, positioning system information scheduling information or just pSIB scheduling information or positioning scheduling information. As mentioned above, the positioning system information scheduling information pSI comprises information about which pSIBs that are included in which SI message. Thus, based on the positioning system information scheduling information pSI, the wireless device 10, 120 will obtain information about the pSIBs comprised in an SI message. As will be described below, scheduling information is compiled into the positioning SIB scheduling information pSI. Thus, based on the specific positioning system information scheduling information pSI, the wireless device 10, 120 may also obtain information about how the pSIBs are scheduled.

In Action 402, the wireless device 10,120 retrieves or receives, from the RNN 20,110, an indication that a pSIB is segmented. Thus, the wireless device 10,120 receives or retrieves, from the RNN 20,110, an indication that a pSIB is segmented into pSIB segments. As will be described below in section 5.2 Positioning SIB segmentation indication, the indication may be one or more out of:

- a segmentation indication per pSIB indicating whether or not the pSIB is segmented;
- a representation of a total number of segments;
- a representation of a number of segments broadcasted per SI window;
- a pSIB meta data indicating a segment number, which pSIB meta data is obtained by the wireless device 120 by decoding a pSIB; and
- a segment indication comprised in the pSIB.

In Action 403, the wireless device 10,120 determines based on the indication and the pSIB scheduling information, i.e. the retrieved or received positioning system information broadcast scheduling details pSI mentioned in Action 401, whether or not the pSIB segments are scheduled via contiguous scheduling.

In some embodiments, the wireless device 10,120 determines whether or not the pSIB segments are scheduled via contiguous scheduling by determining whether or not a scheduling of pSIB segments of the pSIB takes place more frequently than one pSIB segment per positioning SI period. For example, the pSIB segments of the pSIB may be scheduled in contiguous SI windows within the positioning SI period or multiple pSIB segments of the pSIB may be scheduled in one same SI window within the positioning SI period.

If the pSIB segments are scheduled via contiguous scheduling, in Action 404, the device 10,120 monitors the scheduled resources for contiguously scheduled pSIB segments, and retrieves the contiguously scheduled pSIB segments. Thus, when the pSIB segments are determined to be scheduled via contiguous scheduling, the wireless device 10,120 monitors the scheduled resources and retrieves the contiguously scheduled pSIB segments.

As will be described below, the wireless device 10,120 may retrieve the contiguously scheduled pSIB segments by retrieving the pSIB segments of the pSIB until a pSIB segment with a last segment indicator is retrieved.

In Action 405, the device 10,120 decodes the information, e.g. the positioning system information i.e. the positioning assistance data, of the retrieved pSIB segments and uses the information to assist positioning. In other words, the wireless device 10,120 decodes the information of the retrieved segments and uses the information to determine what positioning signals (from satellites, cellular entities, other wireless devices etc.) that are available, in what radio resources the positioning signals are transmitted, or to determine it's position. Thus, the wireless device 10,120 may use the decoded positioning system information to assist positioning of the wireless device 10, 120.

Figure 5:
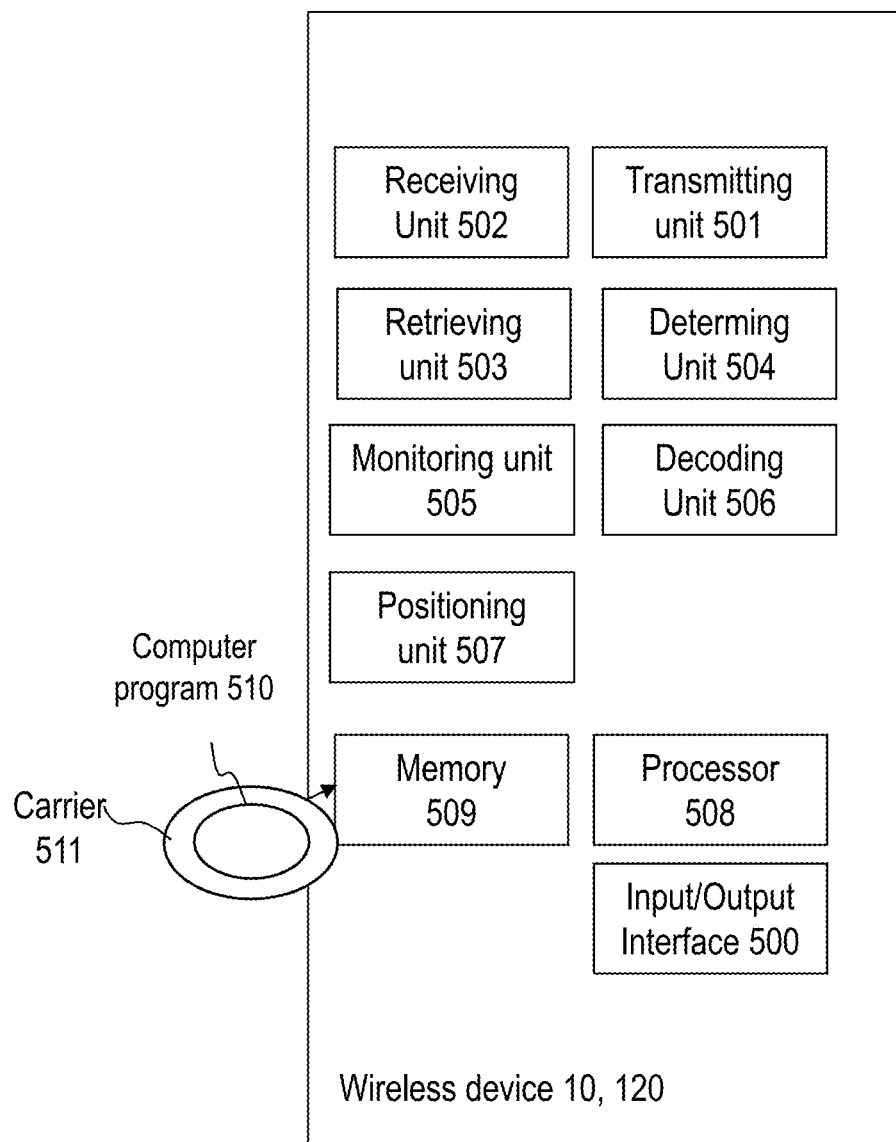
FIG. 5 is a schematic block diagram illustrating embodiments of a wireless device.

To perform the method actions e.g. for receiving positioning system information, the wireless device 10,120 may comprise the arrangement depicted in FIG. 5. The wireless device 120 may e.g. comprise a transmitting unit 501, a receiving unit 502, a retrieving unit 503, a determining unit 504, a monitoring unit 505, a decoding unit 506 and a positioning unit 507 configured to perform one or more of the actions described herein.

The wireless device 10, 120 may be configured to transmit, e.g. by means of the transmitting unit 501, a signal, message or information to one or more nodes operating in the communications network 100.

The wireless device 10, 120 is configured to receive or retrieve, e.g. by means of the receiving unit 502 or the retrieving unit 503, from the radio network node 20, 110, positioning system information broadcast scheduling information (pSI) comprising information about positioning System Information Blocks (pSIBs) that are comprised in a System Information (SI) message.

Further, the wireless device 10,120 is configured to receive or retrieve, from the RNN 20,110, an indication that a pSIB is segmented into pSIB segments. As will be described below in section 5.2 Positioning SIB segmentation indication, the indication may be one or more out of:

- a segmentation indication per pSIB indicating whether or not the pSIB is segmented;
- a representation of a total number of segments;
- a representation of a number of segments broadcasted per SI window;
- a pSIB meta data indicating a segment number, which pSIB meta data is obtained by the wireless device 120 by decoding a pSIB; and
- a segment indication comprised in the pSIB.

Furthermore, the wireless device 10,120 is configured to retrieve contiguously scheduled pSIB segments.

In some embodiments, the wireless device 10, 120 is configured to retrieve the contiguously scheduled pSIB segments by further being configured to retrieve the pSIB segments of the pSIB until a pSIB segment with a last segment indicator is retrieved.

The wireless device 10, 120 is configured to determine, e.g. by means of the determining unit 504, whether or not the pSIB segments are scheduled via contiguous scheduling. The wireless device 10, 120 is configured to perform the determination based on the indication and on the pSI.

The wireless device 10, 120 may be configured to determine whether or not the pSIB segments are scheduled via contiguous scheduling be further being configured to determine whether or not a scheduling of pSIB segments of the pSIB takes place more frequently than one pSIB segment per positioning SI period.

The pSIB segments of the pSIB may be scheduled in contiguous SI windows within the positioning SI period, or multiple pSIB segments of the pSIB may be scheduled in one same SI window within the positioning SI period.

The wireless device 10, 120 is configured to monitor, e.g. by means of the monitoring unit 505, scheduled resources when the pSIB segments are determined to be scheduled via contiguous scheduling.

The wireless device 10, 120 is configured to decode, e.g. by means of the decoding unit 506, position system information of the retrieved pSIB segments.

In some embodiments, the wireless device 10, 120 is configured to perform positioning, e.g. by means of the positioning unit 507, of the wireless device 10, 120. Thus, the wireless device 10, 120 may be configured to use the decoded positioning system information to assist positioning of the wireless device 10, 120.

Those skilled in the art will also appreciate that the units in the wireless device 10,120, described above may refer to a combination of analog and digital circuits, and/or one or more processors configured with software and/or firmware, e.g. stored in the wireless device 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The wireless device 10,120 may comprise an input and output interface 500 configured to communicate with the network node 20,110 and the location server 40,132. The input and output interface may comprise a wireless receiver (not shown) and a wireless transmitter (not shown).

The embodiments herein may be implemented through a respective processor or one or more processors, such as the processor 508 of a processing circuitry in wireless device 10,120 depicted in FIG. 5, together with respective computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 509 comprising one or more memory units. The memory comprises instructions executable by the processor in the wireless device 120.

The memory is arranged to be used to store e.g. data, configurations, and applications to perform the methods herein when being executed in the wireless device 120.

Some embodiments of the wireless device 10,120 may comprise:

a radio circuitry configured to monitor for and retrieve pSIB scheduling information and pSIBs according to the monitoring determined by the processing unit, a storage, configured to store pSIB scheduling information and pSIB segments, a processing unit configured to determine a pSIB monitoring based on the pSIB scheduling information and whether the pSIB segments are contiguously scheduled or not, and also to process the pSI, pSIBs and pSIB segments.

Figure 6:
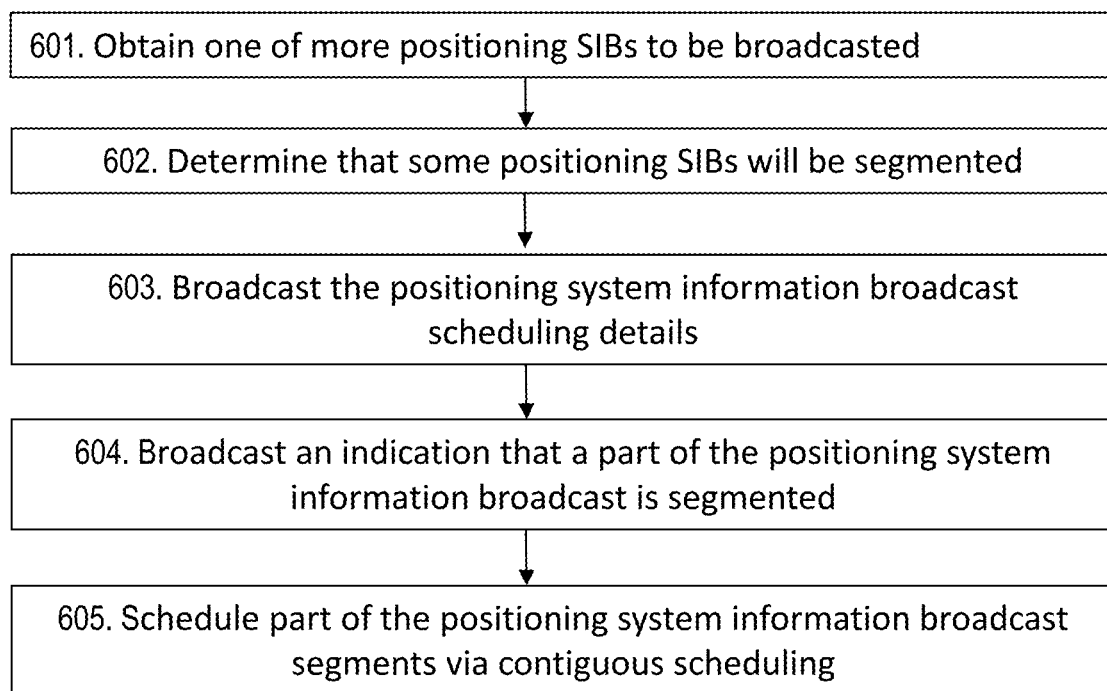
FIG. 6 is a flowchart depicting embodiments of a method in a radio network node.

Example embodiments of a flowchart depicting embodiments of a method performed by the radio network node 20,110, e.g. the eNB, to transmit positioning system information to the wireless device 10,120 is depicted in FIG. 6 and will be described more in detail in the following. As previously mentioned, the RNN 20,110 and the wireless device 10, 120 operate in the wireless communications network 100. The method may comprise one or more of the following actions which actions may be taken in any suitable order. Further, it should be understood that one or more actions may be optional and that actions may be combined.

In Action 601, the RNN 20, 110 obtains one or more positioning assistance data elements from a network node (NN) 30, 132, e.g. a location server, E-SMLC, LMF.

Examples of positioning assistance data elements are GNSS satellite information such as signals and obits (such as the navigation message also provided by the satellites), GNSS RTK corrections as observations from physical or non-physical (calculated observations at a grid point position) reference stations, as error contribution parameters such as atmospheric delays, clock bias, clock drift, etc., OTDOA assistance data.

In Action 602, the RNN 20,110 determines whether or not the positioning assistance data elements will be mapped to positioning SIBs pSIBs that will need to be separated into multiple segmented. In other words, this means that the RNN 20, 110 determines whether or not the positioning assistance data elements will be mapped to positioning SIBs pSIBs that need to be transmitted in multiple segments. Embodiments disclosed herein relates to the case when the pSIBs need to be separated into multiple segments, and in such case, the RNN 20, 110 determines that positioning assistance data elements will be mapped to pSIBs needed to be separated into multiple segments.

The actual separation of the pSIBs may be performed by the network node 30,132, e.g. the location server, and the segments may be passed from the network node 30, 132 to the RNN 20, 110 for transmission. When the RNN 20, 110 determines that the pSIBs need to be transmitted in multiple segments, e.g. by realizing that multiple segments are present, the RNN 20, 110 uses contiguous scheduling for transmission as will be described below.

In Action 603, the radio network node 20,110 broadcasts the positioning system information broadcast scheduling details in the form of pSI. As previously mentioned, the positioning system information broadcast scheduling details is sometimes herein referred to as positioning system information scheduling information or just pSIB scheduling information. As previously mentioned, the positioning system information scheduling information comprises information about pSIBs being comprised in a SI message. Thus, the radio network node 20, 110 broadcasts positioning system information broadcast scheduling information, pSI, comprising information about pSIBs being comprised in a SI message.

In Action 604, the radio network node 20,110 broadcasts an indication that a part of the positioning system information broadcast pSIB is segmented. Thus, the radio network node 20, 110 broadcasts an indication that the pSIB is segmented into pSIB segments.

As previously mentioned, the indication may be one or more out of:

a segmentation indication per pSIB indicating whether or not the pSIB is segmented;

a representation of a total number of segments;

a representation of a number of segments broadcasted per SI window;

a pSIB meta data indicating a segment number, which pSIB meta data is obtained by the wireless device 120 by decoding a pSIB; and a segment indication comprised in the pSIB.

Since any target device, e.g. the wireless device 10, 120, will interpret the segmentation indication as an indication of contiguous scheduling of pSIB segments, the radio network node 20,110 will in Action 605 schedule pSIB segments via contiguous scheduling.

The radio network node 20,110 may schedule the pSIB segments via contiguous scheduling by scheduling the pSIB segments of the pSIB to take place more frequently than one pSIB segment of the pSIB per positioning SI period. This will be described in more detail below under the Section "5.3. Contiguous scheduling of positioning SIBs".

In some embodiments, the pSIB segments of the pSIB are scheduled in contiguous SI windows within the positioning SI period. This will be described in more detail below with reference to FIG. 8B.

In some embodiments, multiple pSIB segments of the pSIB are scheduled in one same SI window within the positioning SI period. This will be described in more detail below with reference to FIG. 8C. In some embodiments, the radio network node 20, 110 broadcasts the contiguously scheduled pSIB segments on scheduled resources.

Figure 7:
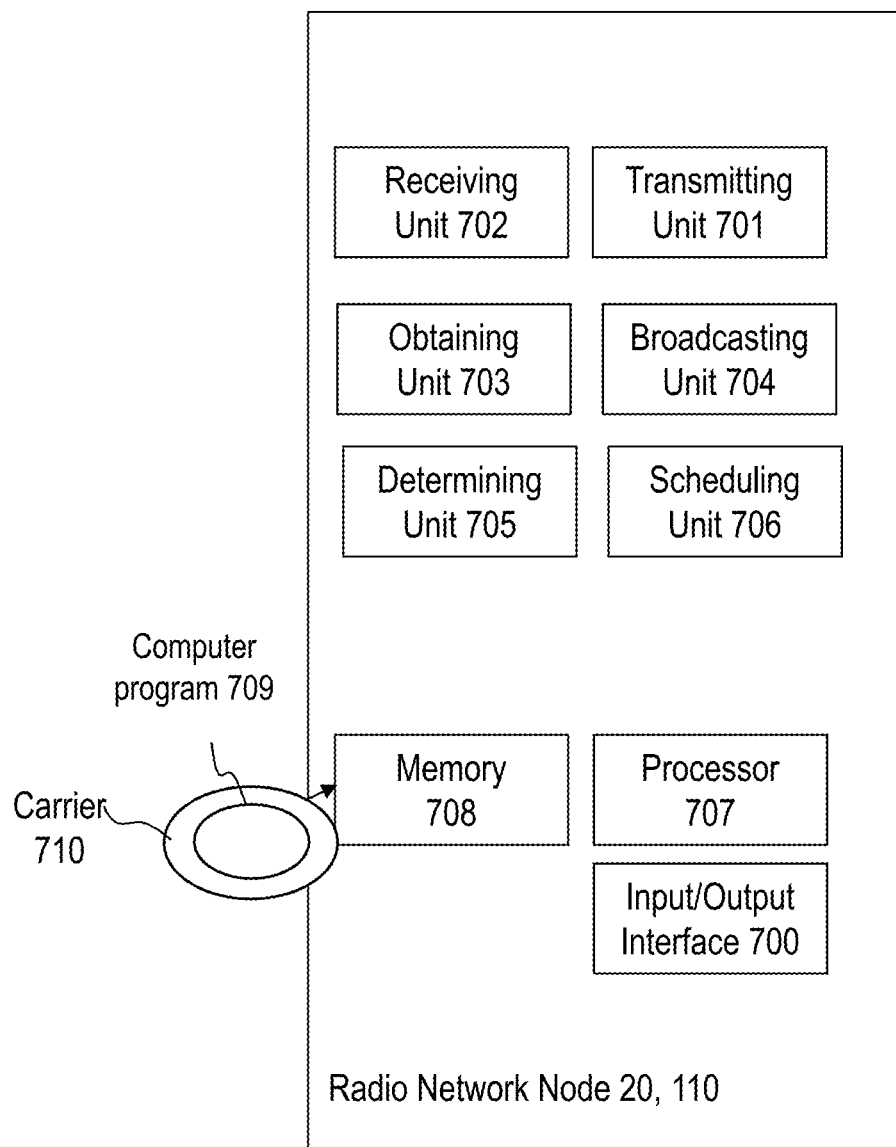
FIG. 7 is schematic block diagram illustrating embodiments of a radio network node.

To perform the method actions e.g. for transmitting positioning system information to the wireless device 10,120, the radio network node 20,110 may comprise the arrangement depicted in FIG. 7. The radio network node 20,110 may e.g. comprise a transmitting unit 701, a receiving unit 702, an obtaining unit 703, a broadcasting unit 704, a determining unit 705, and a scheduling unit 706.

The radio network node 20,110 may be configured to transmit, e.g. by means of the transmitting unit 701, a signal, message or information to one or more nodes operating in the communications network 100.

The radio network node 20,110 is configured to receive, e.g. by means of the receiving unit 702, a signal, message or information from one or more nodes operating in the communications network 100.

The radio network node 20,110 is configured to obtain, e.g. by means of the obtaining unit 703, one or more positioning assistance data elements from a network node 30, 132 operating in the wireless communications network 100.

The radio network node 20,110 is configured to broadcast, e.g. by means of the broadcasting unit 704, positioning system information broadcast scheduling information (pSI) comprising information about pSIBs being comprised in a SI message.

Further, the radio network node 20,110 is configured to broadcast an indication that a pSIB is segmented into pSIB segments. As previously mentioned, the indication may be one or more out of:

a segmentation indication per pSIB indicating whether or not the pSIB is segmented;

a representation of a total number of segments;

a representation of a number of segments broadcasted per SI window;

a pSIB meta data indicating a segment number, which pSIB meta data is obtained by the wireless device (120) by decoding a pSIB; and a segment indication comprised in the pSIB.

In some embodiments, the RNN 20,110 is configured to broadcast the contiguously scheduled pSIB segments on scheduled resources.

The radio network node 20,110 is configured to determine, e.g. by means of the determining unit 705, that positioning assistance data elements will be mapped to pSIBs needed to be separated into multiple segments.

The radio network node 20,110 is configured to schedule, e.g. by means of the scheduling unit 706, the pSIB segments via contiguous scheduling.

In some embodiments, the RNN 20,110 is configured to schedule the pSIB segments via contiguous scheduling by further being configured to schedule the pSIB segments of the pSIB to take place more frequently than one pSIB segment of the pSIB per positioning SI period.

The pSIB segments of the pSIB may be scheduled in contiguous SI windows within the positioning SI period or multiple pSIB segments of the pSIB may be scheduled in one same SI window within the positioning SI period.

Those skilled in the art will also appreciate that the units in the radio network node 20,110 described above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The radio network node 20,110 may comprise an input and output interface 700 configured to communicate with one or more out of the wireless device 10,120, 122, the network node 40,130, and the location server 30,132. The input and output interface may comprise a wireless receiver (not shown) and a wireless transmitter (not shown).

The embodiments herein may be implemented through a respective processor or one or more processors, such as the processor 707 of a processing circuitry in network node 110 depicted in FIG. 7, together with respective computer program code for performing functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 708 comprising one or more memory units. The memory comprises instructions executable by the processor in the network node 110.

The memory is arranged to be used to store e.g. data, configurations, and applications to perform the methods herein when being executed in the network node 110. For example, the memory may comprise the buffer having the buffer size referred to herein.

Some embodiments of the radio network node 20,110 may comprise:

a communication circuitry configured to communicate with and obtain positioning data elements from a NN 30, 132.

a storage configured to store the positioning assistance data and support the processing, a processing unit, configured to determine the possible segmentation of the positioning assistance data, and compilation of the pSIBs, optionally in two or more segments, determining the scheduling of the pSIB segments, and the pSIB scheduling information a radio circuitry configured to broadcast the pSIB segments according to the determined schedule. Thus, the radio network node 20,110 may broadcast scheduled pSIB segments, e.g. contiguously scheduled pSIB segments, on scheduled resources.

In some embodiments, a respective computer program 709 comprises instructions, which when executed by the respective at least one processor, cause the at least one processor of the network node 20, 110 to perform one or more of the actions described herein.

In some embodiments, a respective computer program 510 comprises instructions, which when executed by the respective at least one processor, cause the at least one processor of the wireless device 10,120 to perform the actions described herein.

In some embodiments, a respective carrier 511, 710 comprises the respective computer program, wherein the carrier is one of an electronic signal, an optical signal, an electromagnetic signal, a magnetic signal, an electric signal, a radio signal, a microwave signal, or a computer-readable storage medium.

Below a More Detailed Description Will Follow.

Embodiments disclosed herein may be separated into different parts which will be described in more detail below. For example, the positioning assistance data is discussed in section 1.1, different means to provide the positioning SIB segmentation indication in section 1.2, different ways to realize contiguous scheduling in section 1.3 and some signaling aspects in section 1.4.

1.1 Positioning Assistance Data for System Information Broadcast

RTK corrections comprise some of the Positioning assistance data (AD) that is supported in the 3GPP Rel-15. This may be divided into two message types; a common message type and a generic message type. Common messages are in common for all GNSS, while the generic messages are associated to a specific GNNS via a configured GNSS-ID.

For example, the GNSS assistance data may be realized by the following assistance data elements. In one mode of some embodiments, each positioning assistance data element corresponds to a pSIB type.

|  | assistanceDataElement |
|---|---|
| GNSS Common Assistance Data | GNSS-ReferenceTime |
|  | GNSS-ReferenceLocation |
|  | GNSS-IonosphericModel |
|  | GNSS-EarthOrientationParameters |
|  | GNSS-RTK-ReferenceStationInfo |
|  | GNSS-RTK-CommonObservationInfo |
|  | GNSS-RTK-AuxiliaryStationData |
| GNSS Generic Assistance Data | GNSS-TimeModelList |
|  | GNSS-DifferentialCorrections |
|  | GNSS-NavigationModel |
|  | GNSS-RealTimeIntegrity |
|  | GNSS-DataBitAssistance |
|  | GNSS-AcquisitionAssistance |
|  | GNSS-Almanac |
|  | GNSS-UTC-Model |
|  | GNSS-AuxiliaryInformation |
|  | BDS-DifferentialCorrections |
|  | BDS-GridModelParameter |
|  | GNSS-RTK-Observations |
|  | GLO-RTK-BiasInformation |
|  | GNSS-RTK-MAC-CorrectionDifferences |
|  | GNSS-RTK-Residuals |
|  | GNSS-RTK-FKP-Gradients |
|  | GNSS-SSR-OrbitCorrections |
|  | GNSS-SSR-ClockCorrections |
|  | GNSS-SSR-CodeBias |

In addition, there may be additional pSIB types defined associated to other positioning methods. One example is the downlink Observed Time Difference of Arrival (downlink OTDOA) method.

The pSIB type may be associated to an enumerable parameter, for example grouped by the categories below, or as a linear index per type. The size of each pSIB depends on a number of things such as whether the positioning assistance data has been segments into multiple segments already at the network node 30,132, e.g. the location server, or if the full assistance data element is encoded. Furthermore, some assistance data elements scale with the number of satellites included in the assistance data element, etc. The network node 30, 132, e.g. the location server, will encode the positioning assistance data, optionally encrypt it, and send it to the radio network node 20, 110 as one or more segments per pSIB type. Some positioning assistance data will be encoded separately per GNSS. Therefore, the NN 30, 132 will indicate to the RNN 20,110 the GNSS per pSIB type. The RNN 20 will take the encoded positioning assistance data element, either provided as one or more segments and compile a pSIB per segment.

The pSIB itself may also include segmentation information such as sequence number, last segment indication etc.

The positioning pSIBs are scheduled by the RNN 20, 110, and the scheduling information is compiled into a positioning SIB scheduling information pSI. The positioning SIB scheduling information also includes the GNSS ID per pSIB type (when applicable), whether the pSIB is encrypted, typically by providing the decryption key index per pSIB. Different means to indicate whether or not the pSIB is segmented is described in the next section 1.2.

1.2 Positioning SIB Segmentation Indication

In some embodiments, the positioning scheduling information, i.e. the positioning system information scheduling information, includes a segmentation indication per pSIB. In one mode, the indication is a BOOLEAN per pSIB, indicating if the pSIB is segmented or not. In another mode, the indication instead represents the total number of segments. In yet another mode, the indication represents the number of segments broadcasted per SI window (see further details in the next section).

In yet another mode, the device, e.g. the wireless device 10,120, evaluates the segmentation indication by decoding a pSIB. If the pSIB meta data indicates a segment number, then the device will determine that the pSIB is segmented.

In some other embodiments, the segment indication is in the pSIB as above, but the indication also comprise a persistent scheduling component, where the SI identity associated to the pSIB is configured via a control channel with a set of persistent radio resources such as periodic radio resources. In this case, the UE, e.g. the wireless device 10,120, will retrieve the scheduled data packets of the persistent scheduling as long as there are segments left associated to the specific pSIB, for example as indicated by a last segment indicator.

1.3 Contiguous Scheduling of Positioning SIBs

Figure 8A:
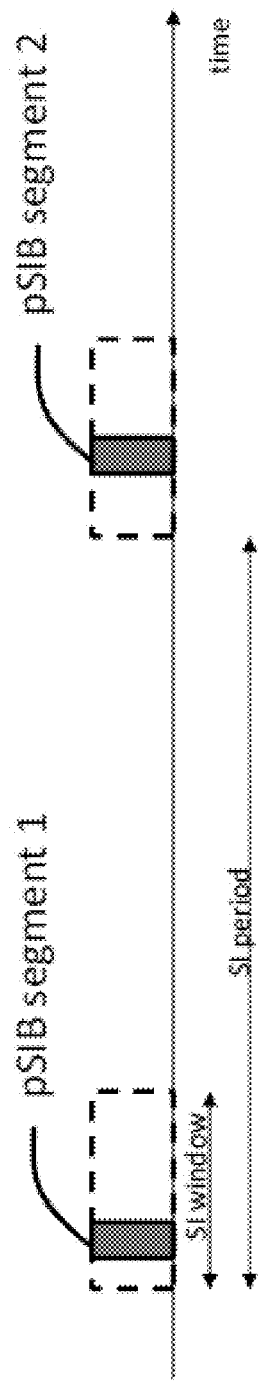
FIG. 8A is schematic block diagram illustrating legacy scheduling.

In some embodiments, the term contiguous scheduling corresponds to a scheduling of pSIB segments that takes place more frequently than one pSIB segment of the specific pSIB per positioning SI period. The contiguous scheduling is illustrated by FIGS. 8A-8C, wherein FIG. 8A represents legacy scheduling and FIGS. 8B and 8C illustrate components of contiguous scheduling according to some embodiments disclosed herein.

Figure 8B:
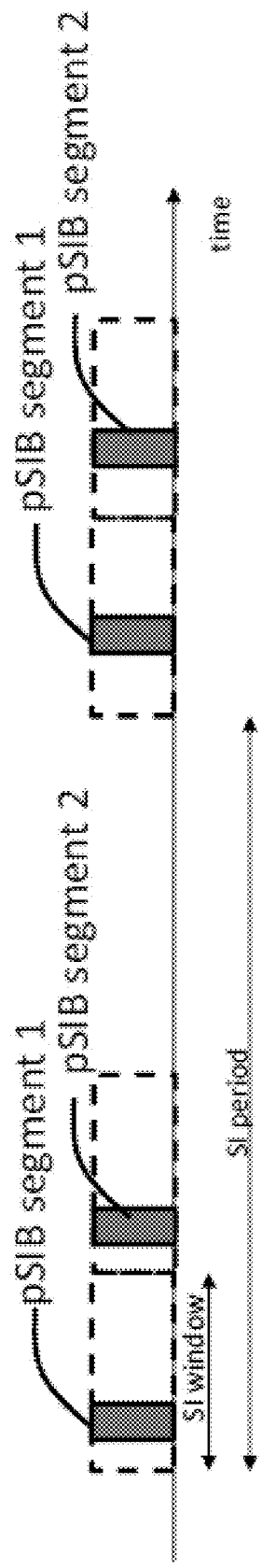
FIG. 8B is schematic block diagram illustrating embodiments of contiguous scheduling.

In one embodiment illustrated by FIG. 8B, the RNN 20,110 will schedule the different segments of the same pSIB in contiguous SI windows. The UE 10, 120 will monitor the next window as long as the previous window did not include a segment with a last segment indicator.

Figure 9:
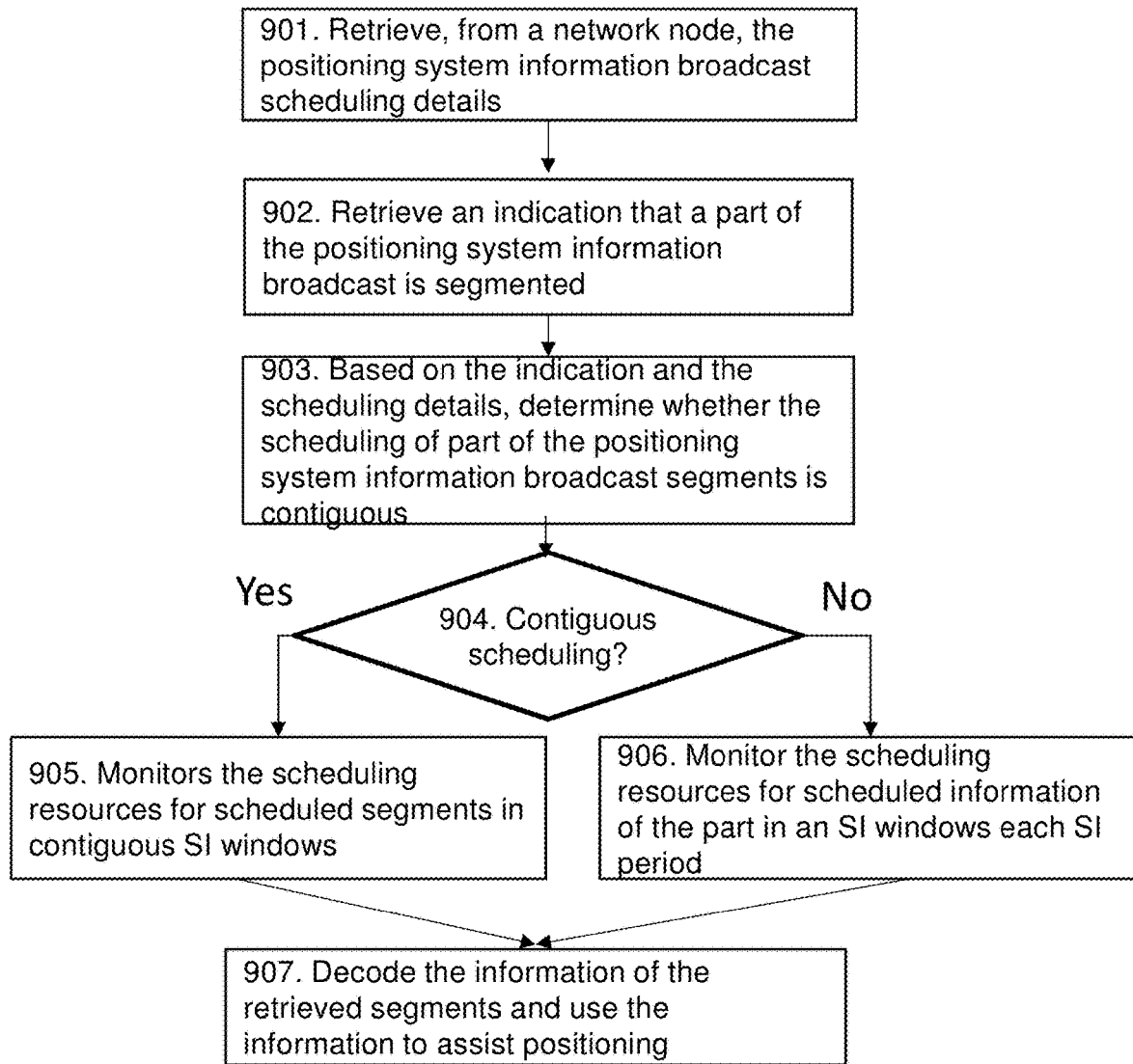
FIG. 9 is a flowchart depicting embodiments of a method in a wireless device.

This embodiment is also illustrated by the flow chart of FIG. 9, which essentially is the same flow chart as FIG. 4 previously described, but with Action 404 replaced by Actions 904, 905 and 906. Hence Action 401 corresponds to Action 901, Action 402 corresponds to Action 902, Action 403 corresponds to Action 903, and Action 405 corresponds to Action 907. In Action 904, the device, e.g. the wireless device 10,120, is determining whether the pSIB segments of a specific pSIB are provided via contiguous scheduling or not. If this is the case, then in Action 905, the UE monitors contiguous SI windows for the pSIB segments, and if not the case, in Action 906, the UE monitors for one pSIB segment every SI period within an SI window as in legacy.

Figure 8C:
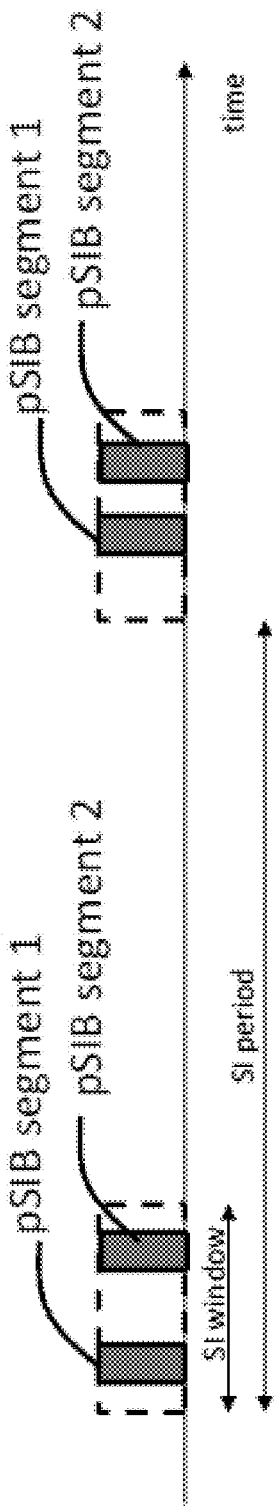
FIG. 8C is schematic block diagram illustrating embodiments of contiguous scheduling.

In another embodiment, illustrated by FIG. 8C, the RNN 20,110 will schedule multiple segments of the specific pSIB in the same SI window. The device 10,120 will retrieve pSIB segments associated to the pSIB until a pSIB segment is retrieved with a last segment indicator.

Figure 10:
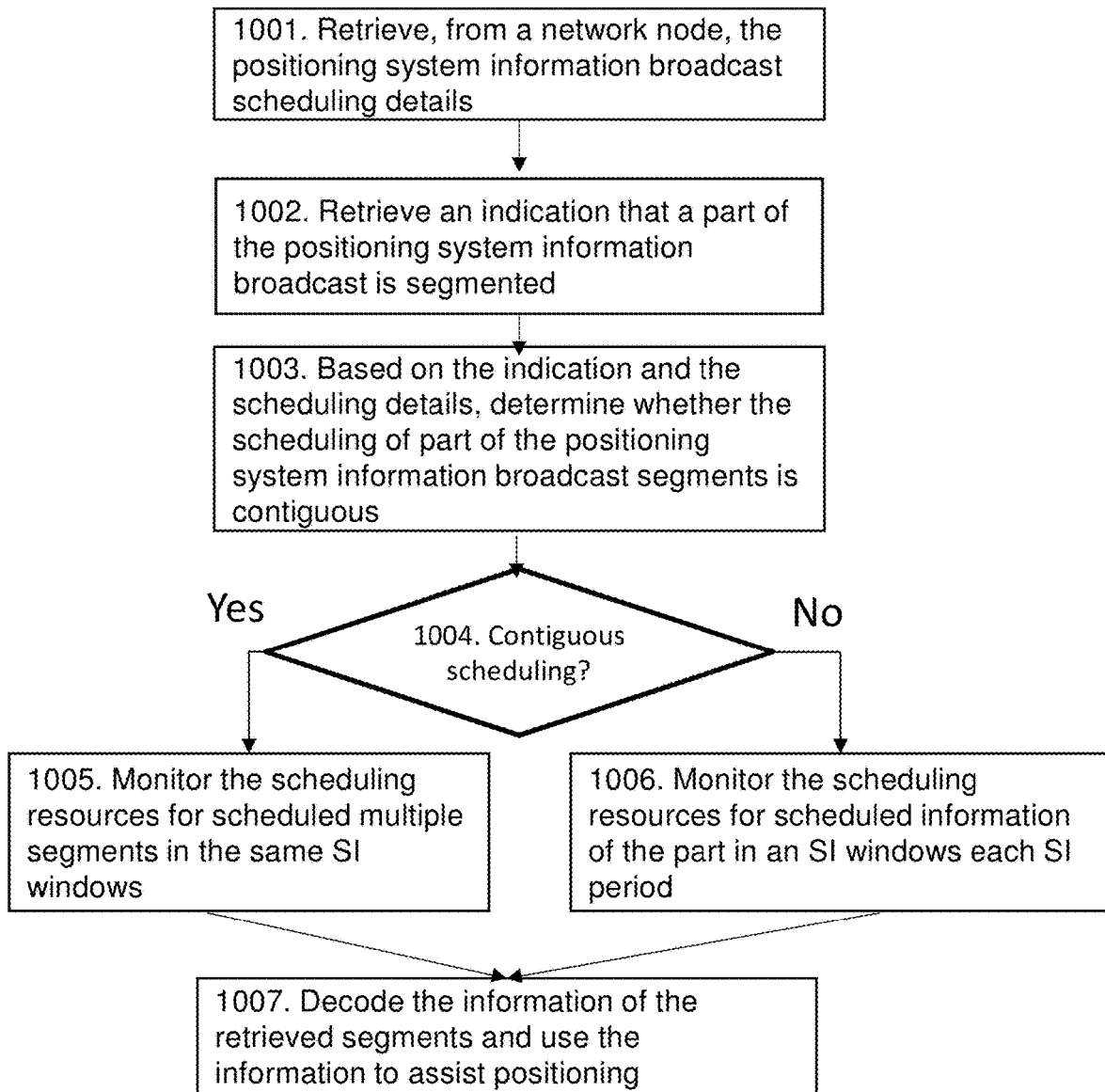
FIG. 10 is a flowchart depicting embodiments of a method in a wireless device.

This embodiment is also illustrated by the flow chart of FIG. 10, which essentially is the same flow chart as FIG. 4, but with action 404 replaced by actions 1004, 1005 and

1006. Hence action 401 corresponds to Action 1001, Action 402 corresponds to Action 1002, Action 403 corresponds to Action 1003, and Action 405 corresponds to Action 1007. In action 1004, the device 10, 120 is determining whether the pSIB segments of a specific pSIB are provided, i.e. transmitted such as broadcasted, via contiguous scheduling or not. If this is the case, then in action 1005, the UE monitors the SI windows for all the pSIB segments, and if not the case, in action 1006, the UE monitors for one pSIB segment every SI period within an SI window as in legacy.

In yet another embodiment, the combination of FIGS. 8B and 8C is considered, where the UE 10,120 continues to monitor SI windows until a pSIB segment with a last segment indicator has been retrieved, and continue to monitor for pSIB segments of an SI window also when a pSIB segment of a specific pSIB has been retrieved.

In one mode of these embodiments the segment indicator describes the total number of segments of a specific pSIB, and the device 10,120 monitors for pSIB segments of the specific pSIB until that number of segments has been retrieved.

In yet another mode of the embodiments, the segmentation indicator describes the number of pSIB segments of the specific pSIB that are transmitted in an SI window. In yet another mode of the embodiments, the segmentation indicator describes the max number of pSIB segments of the specific pSIB that are transmitted in an SI window.

1.4 Signaling Aspects

Figure 11:
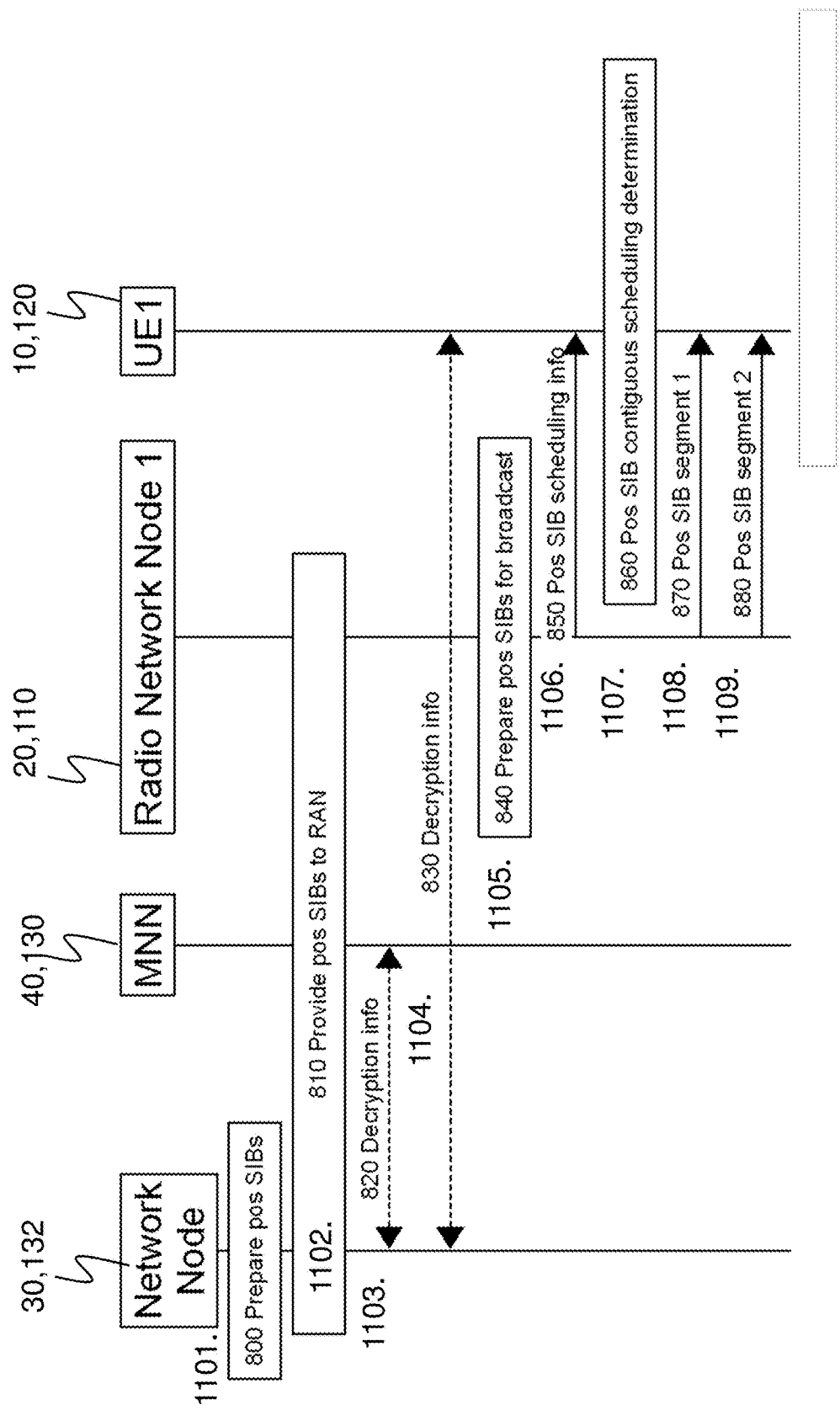
FIG. 11 is a combined block diagram and flowchart schematically illustrating exemplifying signaling in a wireless communications network.

FIG. 11 provides a signaling chart. As a preparatory action, the NN 30, 132 prepares (cf. 800, Action 1101) positioning assistance data, i.e. pSIBs, optionally pseudo segmented. These are (cf. 810, Action 1102) provided to the radio network node 20, 110, possibly routed via another node, for example a Mobility Network Node (MNN) 40, 130. If optional encryption of the positioning assistance data is considered, the decryption information may be provided to the MNN 40, in 820, Action 1103. Thus, the NN 30,132 may encrypt the positioning assistance data and transmit the decryption information to the MNN 40. In that case, the device 10,120 may obtain these keys from the MNN 40, 130 in 830, Action 1104. The radio network node 20,110 may also segment the positioning assistance data elements before compiling into pSIB segments. The RNN 20, 110 also compiles the positioning SIB scheduling info pSI, 840, Action 1105. The RNN 20, 110 broadcasts, action 850, 1106, the pSI. The device 10, 120 retrieves the pSI and obtains the pSIB segmentation indication to determine whether or not the pSIB segments are provided via contiguous scheduling, action 860, 1107. Based on the information about how the pSIB segments are scheduled, the device 10,120 retrieves the first pSIB segment of the specific pSIB, action 870, 1108, the next pSIB segment in action 880, 1109 and onwards until all segments of the specific pSIB has been obtained.

From the above, it is understood that embodiments also relate to a method performed by a network node 30, 132, e.g. a location server, for assist the RNN 20, 110 in transmitting positioning system information to the wireless device 10, 120. As previously mentioned, the network node 30, 132, the RNN 20, 110 and the wireless device 10, 120 operate in the wireless communications network 100.

In Action 800, 1101 the network node 30,132 prepares positioning System Information Blocks, pSIBs. In some embodiments, the network node 30,132 prepares pseudo segmented pSIBs. In pseudo segmentation, the network node 30, 132 segments the data in such a way that each segment may be decoded independently by the wireless device, without the need of having to accumulate all the segments.

In Action 810, 1102, the network node 30,132 provides, e.g. transmits, the pSIBs to the RNN 20, 110.

The network node 30, 132 may encrypt the pSIBs and in Action 820, 1103 the network node 30, 132 may transmit decryption information to the MNN 40, 130 operating in the wireless communications network 100.

Figure 12:
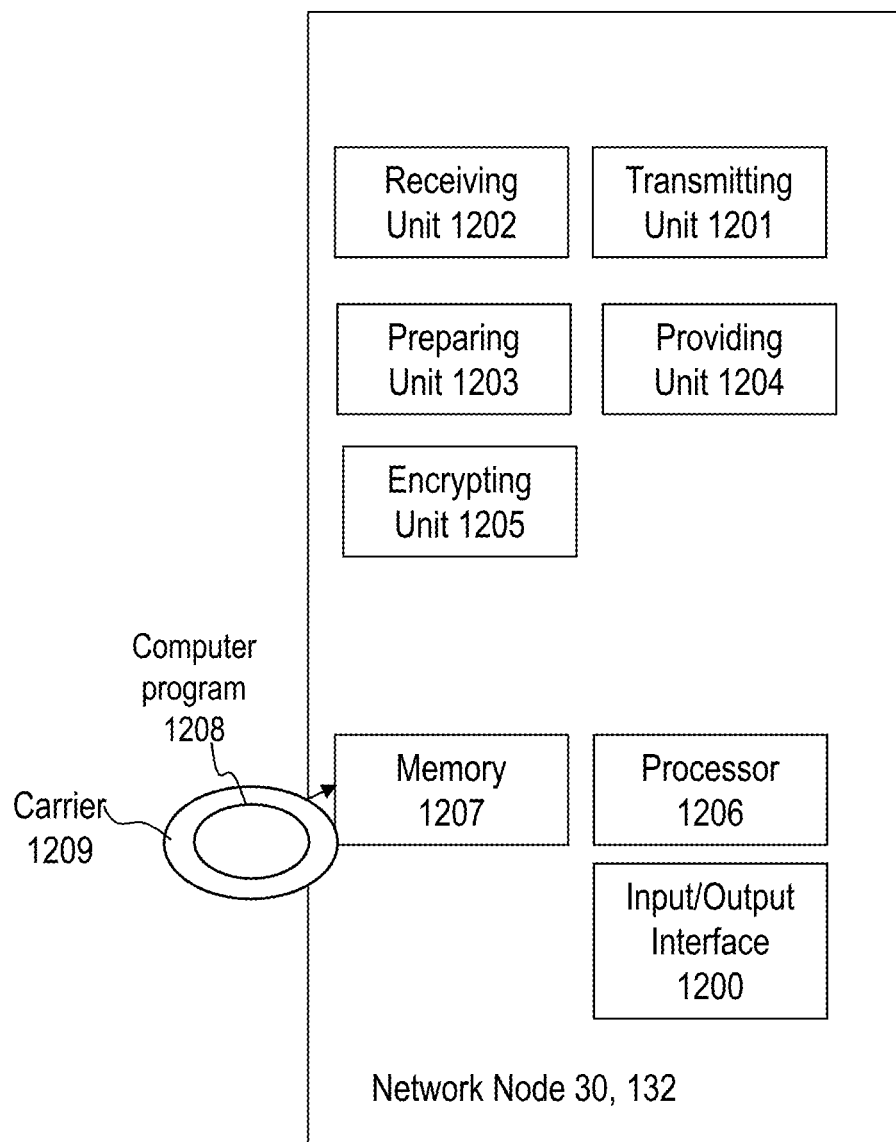
FIG. 12 is a flowchart depicting embodiments of a method in a MN.

To perform the method actions e.g. for assist a RNN 20,110 to transmit positioning system information to the wireless device 10,120, the network node 30,132, e.g. a location server such as an E-SMLC, may comprise the arrangement depicted in FIG. 12. The network node 30,132 may e.g. comprise a transmitting unit 1201, a receiving unit 1202, a preparing unit 1203, a providing unit 1204, and an encryption unit 1205.

The network node 30,132 may be configured to transmit, e.g. by means of the transmitting unit 1201, a signal, message or information to one or more nodes operating in the communications network 100.

In some embodiments, the network node 30,132 is configured to transmit decryption information to a Mobility Network Node (MNN) 40, 130 operating in the wireless communications network 10.

The network node 30,132 is configured to receive, e.g. by means of the receiving unit 1202, a signal, message or information from one or more nodes operating in the communications network 100.

The network node 30,132 is configured to prepare, e.g. by means of the preparing unit 1203, positioning System Information Blocks, pSIBs.

In some embodiments, the network node 30,132 is configured to prepare pseudo segmented pSIBs.

The network node 30,132 is configured to provide, e.g. by means of the providing unit 1204, the pSIBs to the RNN 20, 110. In some embodiments, the network node 30,132 provides the pSIBs to the RNN 20, 110, by transmitting them the RNN 20,110 by means of the transmitting unit 1201.

The network node 30,132 is configured to encrypt, e.g. by means of the encryption unit 1205, encrypt the pSIBs.

Those skilled in the art will also appreciate that the units in the network node 30,132 described above may refer to a combination of analog and digital circuits, and/or one or more processors configured with software and/or firmware, e.g. stored in the network node 30,132 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The network node 30,132 may comprise an input and output interface 1200 configured to communicate with one or more out of the wireless device 10,120, 122, the network node 40,130, and the RNN 20,110. The input and output interface may comprise a wireless receiver (not shown) and a wireless transmitter (not shown).

The embodiments herein may be implemented through a respective processor or one or more processors, such as the processor 1206 of a processing circuitry in network node 30,132 depicted in FIG. 12, together with respective computer program code for performing functions and actions of the embodiments herein. The program code mentioned above may also be provided as a computer program product, for instance in the form of a data carrier carrying computer program code for performing the embodiments herein when being loaded into the network node 30,132. One such carrier may be in the form of a CD ROM disc. It is however feasible with other data carriers such as a memory stick. The computer program code may furthermore be provided as pure program code on a server and downloaded to the network node 30,132.

The network node 30,132 may further comprise a memory 1207 comprising one or more memory units. The memory comprises instructions executable by the processor in the network node 30,132.

The memory is arranged to be used to store e.g. data, configurations, and applications to perform the methods herein when being executed in the network node 30,132.

In some embodiments, a respective computer program 1208 comprises instructions, which when executed by the respective at least one processor, cause the at least one processor of the network node 30,132 to perform the actions described herein.

In some embodiments, a respective carrier 1209 comprises the respective computer program, wherein the carrier is one of an electronic signal, an optical signal, an electromagnetic signal, a magnetic signal, an electric signal, a radio signal, a microwave signal, or a computer-readable storage medium.

1.4.1 Example—a GNSS RTK MAC Assistance Data Element:

In a normal deployment, there may be around 16 RTK stations and correction data from around 12 satellites. Considering below GNSS RTK MAC Correction Difference Information Element and computing it's size based upon 16 stations and 12 satellites, the total size can be 1437 bytes.

```
GNSS-RTK-MAC-CorrectionDifferences-r15 ::= SEQUENCE {
    networkID-r15                           INTEGER (0..255),
    subNetworkID-r15                        INTEGER
(0..15)                                     OPTIONAL,
    master-ReferenceStationID-r15           INTEGER (0..4095),
    rtkCorrectionDifferencesList-r15        RTK-CorrectionDifferencesList-r15,
    ...
}
RTK-CorrectionDifferencesList-r15 ::= SEQUENCE (SIZE (1..32)) OF RTK-
CorrectionDifferencesElement-r15
RTK-CorrectionDifferencesElement-r15 ::= SEQUENCE {
    epochTime-r15                           GNSS-SystemTime,
    auxiliary-referenceStationID-r15        GNSS-ReferenceStationID-r15,
    geometric-ionospheric-corrections-differences-r15
                                            Geometric-Ionospheric-Corrections-Differences-r15,
    ...
}
Geometric-Ionospheric-Corrections-Differences-r15 ::= SEQUENCE (SIZE(1..64)) OF
                                            Geometric-
Ionospheric-Corrections-Differences-Element-r15
Geometric-Ionospheric-Corrections-Differences-Element-r15 ::= SEQUENCE {
    svID-
    r15                                     SV-ID,
        ambiguityStatusFlag-
    r15                                     INTEGER (0..3),
        non-synch-count-
    r15                                     INTEGER (0..7),
        geometricCarrierPhaseCorrectionDifference-r15     INTEGER (-
65536..65535),
        iod-
    r15                                     BIT
STRING (SIZE(11)),
        ionosphericCarrierPhaseCorrectionDifference-r15   INTEGER (-
65536..65535),
    ...
}
```

The 3GPP TS 36.331, clause 5.2 states the following on the SIB size

"The physical layer imposes a limit to the maximum size a SIB can take. When DCI format 1C is used the maximum allowed by the physical layer is 1736 bits (217 bytes) while for format 1A the limit is 2216 bits (277 bytes), see TS 36.212 [22] and TS 36.213 [23]. For BL UEs and UEs in CE, the maximum SIB and SI message size is 936 bits, see TS 36.213 [23]. For NB-IoT, the maximum SIB and SI message size is 680 bits, see TS 36.213 [23]."

Based upon above limitation, there will be need of 6 SIB segments for LTE DCI format 1A (277 bytes).

Assuming SIB periodicity of rf32 (320 ms) and SI window of 10 ms, as per legacy mechanism, the total delay/duration to transmit the 6 SIB segments would be, 6*SI_Window*SIB_Periodicty=6*10*320=19.2 s In this embodiment, it is claimed that the SIB segments are transmitted back to back without waiting for the SIB periodicity. Thus, removing the latency incurred by SI periodicity. Total duration to transmit the 6 SIB segments would be 6*SI_Window=60 ms.

Thus, each SIB segment is mapped to an SI message which has its own periodicity and is scheduled back to back without waiting for the next pSIB period.

1.4.2 Encoding Example, Segmentation Indication Via BOOLEAN:

In this mode, the segmentation indicator explicitly indicates contiguous scheduling of pSIB segments:

```
Pos-SchedulingInfoList-r15 ::= SEQUENCE (SIZE (1..maxSI-Message)) OF Pos-
SchedulingInfo-r15
Pos-SchedulingInfo-r15 ::= SEQUENCE {
    pos-si-Periodicity-r15          ENUMERATED {rf8, rf16, rf32, rf64, rf128, rf256,
rf512},
    pos-sib-MappingInfo-r15         Pos-SIB-MappingInfo-r15
}
Pos-SIB-MappingInfo-r15 ::= SEQUENCE (SIZE (1..maxSIB)) OF Pos-SIB-Type-r15
Pos-SIB-Type-r15 ::= SEQUENCE {
    encKeyIndex-r15                 INTEGER (0..15)         OPTIONAL,  -- Need OP
    gnss-id-r15                     GNSS-ID-r15             OPTIONAL,  -- Need OP
    sbas-id-r15                     SBAS-ID-r15             OPTIONAL,  -- Need OP
    segmContSched-r15 BOOLEAN                               OPTIONAL,  -- Need OP
    pos-sib-type-r15 ENUMERATED {
                                        posSibType-1.1,
                                        posSibType-1.2,
                                        posSibType-1.3,
                                        posSibType-1.4,
                                        posSibType-1.5,
                                        posSibType-1.6,
                                        posSibType-1.7,
                                        posSibType-2.1,
                                        posSibType-2.2,
                                        posSibType-2.3,
                                        posSibType-2.4,
                                        posSibType-2.5,
                                        posSibType-2.6,
                                        posSibType-2.7,
                                        posSibType-2.8,
                                        posSibType-2.9,
                                        posSibType-2.10,
                                        posSibType-2.11,
                                        posSibType-2.12,
                                        posSibType-2.13,
                                        posSibType-2.14,
                                        posSibType-2.15,
                                        posSibType-2.16,
                                        posSibType-2.17,
                                        posSibType-2.18,
                                        posSibType-2.19,
                                        posSibType-3.1,
                                        posSibType-3.2,
                                        ... }
}
```

Upon retrieving the segmentation indication, the UE, e.g. the wireless device 10, 120, will monitor for contiguously scheduled pSIBs.

1.4.3 Encoding Example, Segmentation Indication Via Number of Segments

In this mode, the segmentation indication is via an integer (range is up to dimensioning), defined as either The total number of segments of a specific pSIB The number of segments scheduled in the same SI window

---

```
Pos-SchedulingInfoList-r15 ::= SEQUENCE (SIZE (1..maxSI-Message)) OF Pos-SchedulingInfo-r15
Pos-SchedulingInfo-r15 ::= SEQUENCE {
    pos-si-Periodicity-r15          ENUMERATED {rf8, rf16, rf32, rf64, rf128, rf256, rf512},
    pos-sib-MappingInfo-r15         Pos-SIB-MappingInfo-r15
}
Pos-SIB-MappingInfo-r15 ::= SEQUENCE (SIZE (1..maxSIB)) OF Pos-SIB-Type-r15
Pos-SIB-Type-r15 ::= SEQUENCE {
    encKeyIndex-r15                 INTEGER (0..15)         OPTIONAL,  -- Need OP
    gnss-id-r15                     GNSS-ID-r15             OPTIONAL,  -- Need OP
    sbas-id-r15                     SBAS-ID-r15             OPTIONAL,  -- Need OP
    segmContSched-r15 INTEGER (2..17)                       OPTIONAL,  -- Need OP
    pos-sib-type-r15 ENUMERATED {
                                    posSibType-1.1,
                                    posSibType-1.2,
                                    posSibType-1.3,
                                    posSibType-1.4,
                                    posSibType-1.5,
                                    posSibType-1.6,
                                    posSibType-1.7,
                                    posSibType-2.1,
                                    posSibType-2.2,
                                    posSibType-2.3,
                                    posSibType-2.4,
                                    posSibType-2.5,
                                    posSibType-2.6,
                                    posSibType-2.7,
                                    posSibType-2.8,
                                    posSibType-2.9,
                                    posSibType-2.10,
                                    posSibType-2.11,
                                    posSibType-2.12,
                                    posSibType-2.13,
                                    posSibType-2.14,
                                    posSibType-2.15,
                                    posSibType-2.16,
                                    posSibType-2.17,
                                    posSibType-2.18,
                                    posSibType-2.19,
                                    posSibType-3.1,
                                    posSibType-3.2,
                                    ... }
}
```

---

Upon retrieving the segmentation indication, the UE, e.g. the wireless device 10, 120, will monitor for contiguously scheduled pSIBs.

Further Extensions and Variations

Figure 13:
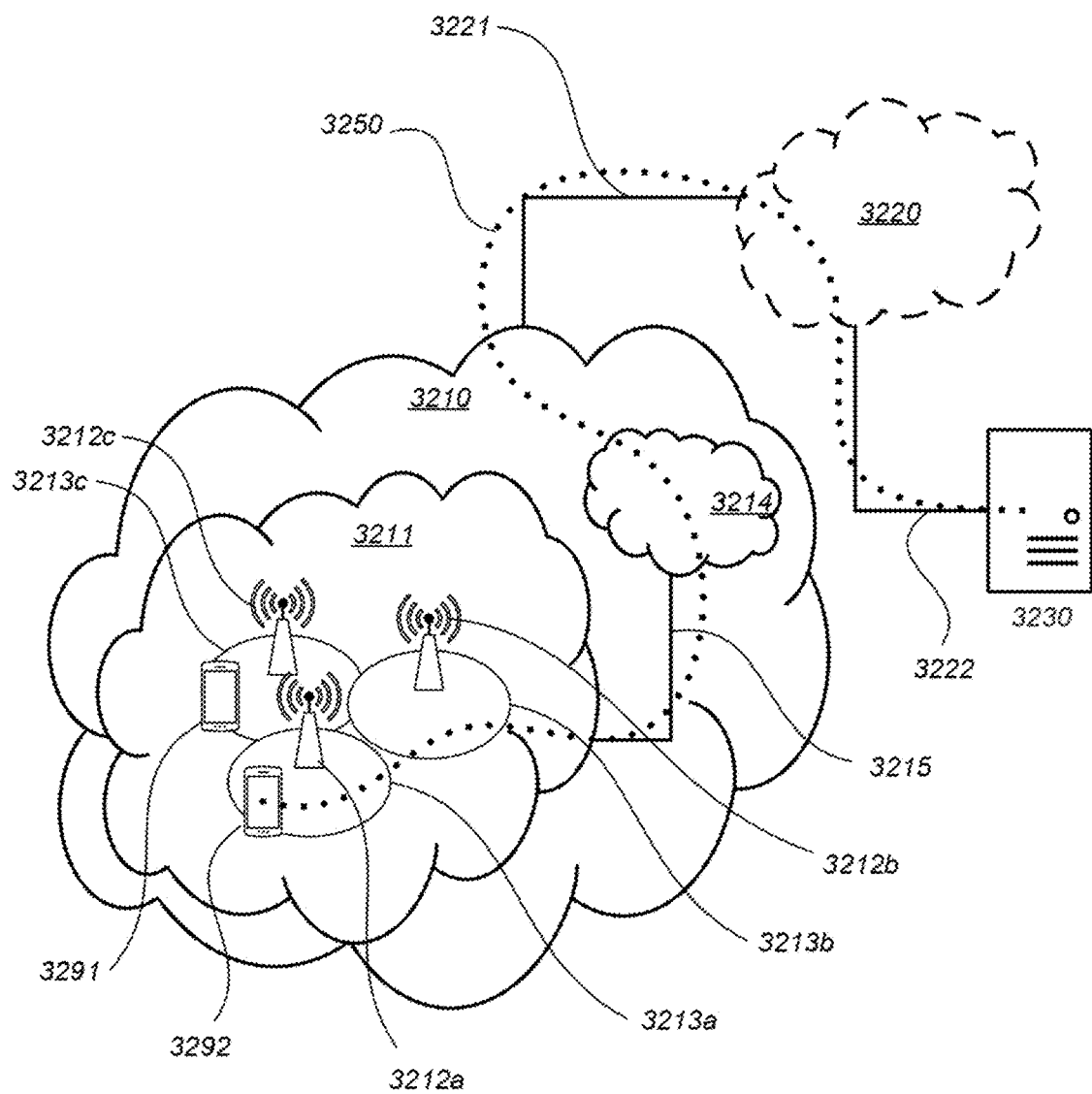
FIG. 13 schematically illustrates a telecommunication network connected via an intermediate network to a host computer.

With reference to FIG. 13, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
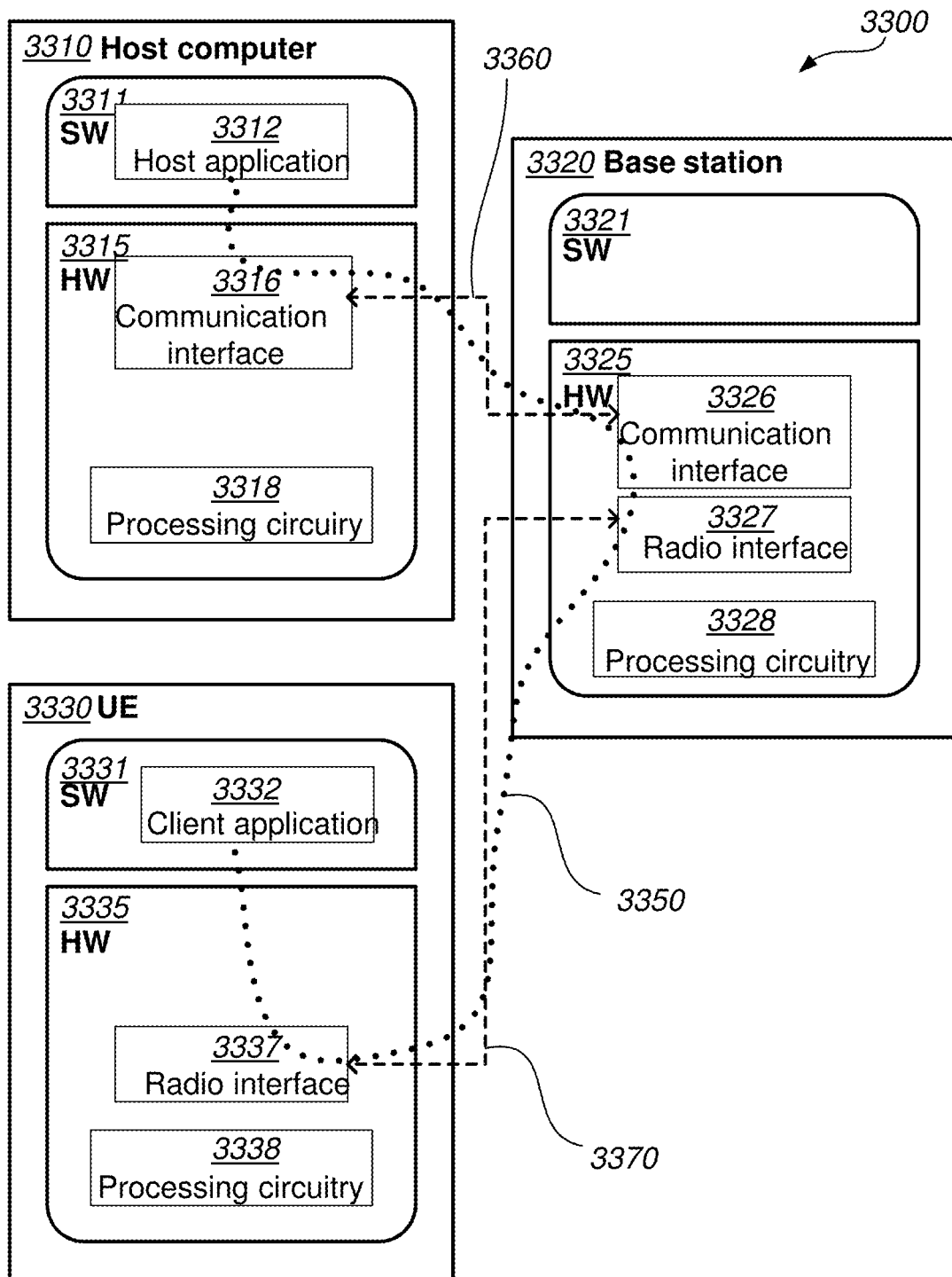
FIG. 14 is a generalized block diagram of a host computer communicating via a base station with a user equipment over a partially wireless connection.

It is noted that the host computer 3310, base station 3320 and UE 3330 illustrated in FIG. 14 may be identical to the host computer 3230, one of the base stations 3212a, 3212b, 3212c and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure.

One or more of the various embodiments improve the performance of OTT services provided to the UE 3330 using the OTT connection 3350, in which the wireless connection 3370 forms the last segment. More precisely, the teachings of these embodiments may improve the latency, and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIGS. 13 and 14 and the corresponding text are about a downstream aspect of the radio-related invention, while FIGS. 15 and 16 and the corresponding text discuss an upstream aspect.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 13 and 14. For simplicity of the present disclosure, only drawing references to FIG. 15 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 13 and 14. For simplicity of the present disclosure, only drawing references to FIG. 16 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 17 is a flowchart illustrating a method implemented in a communication system, in accordance with one embodiment. The communication system includes a host computer, a base station such as a AP STA, and a UE such as a Non-AP STA which may be those described with reference to FIGS. 13 and 14. For simplicity of the present disclosure, only drawing references to FIG. 17 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 13 and 14. For simplicity of the present disclosure, only drawing references to FIG. 18 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| RTK | Real Time Kinematics |
| AD | Assistance Data |
| NN | Network Node |
| E-SMLC | Evolved Serving Mobile Location Center |
| LMF | Location Management Function |
| MNN | Mobility Network Node |
| MME | Mobility Management Entity |
| AMF | Access and Mobility Function |
| RNN | Radio Network Node |
| UE | User Equipment |
| OTDOA | Observed Time Difference of Arrival |
| SIB | System Information Block |
| pSIB | Positioning System Information Block |
| pSI | positioning system information block scheduling information |
| RRC | Radio Resource Control |
| GPS | Global Positioning System |
| GNSS | Global Navigation Satellite System |

The invention claimed is:

1. A method performed by a wireless device for receiving positioning system information broadcast scheduling information, pSI, comprising information about positioning System Information Blocks, pSIBs, that are comprised in a System Information, SI, message from a radio network node, wherein the wireless device and the radio network node, RNN, operate in a wireless communications network, wherein the method comprises:
  determining based on an indication that a pSIB is segmented into pSIB segments and based on the pSI that the pSIB segments are scheduled via contiguous scheduling;
  monitoring scheduled resources and retrieving the contiguously scheduled pSIB segments.

2. The method of claim 1, wherein the method further comprises:
  decoding position system information of the retrieved pSIB segments.

3. The method of claim 1, further comprising:
  using the decoded positioning system information to assist positioning of the wireless device.

4. The method of claim 1, wherein the indication is one or more out of:
  a segmentation indication per pSIB indicating whether or not the pSIB is segmented;
  a representation of a total number of segments;
  a representation of a number of segments broadcasted per SI window;
  a pSIB meta data indicating a segment number, which pSIB meta data is obtained by the wireless device by decoding a pSIB; and
  a segment indication comprised in the pSIB.

5. The method of claim 1, wherein the determining whether or not the pSIB segments are scheduled via contiguous scheduling comprises:
  determining whether or not a scheduling of pSIB segments of the pSIB takes place more frequently than one pSIB segment per positioning SI period.

6. The method of claim 5, wherein the pSIB segments of the pSIB are scheduled in contiguous SI windows within the positioning SI period.

7. The method of claim 5, wherein multiple pSIB segments of the pSIB are scheduled in one same SI window within the positioning SI period.

8. The method of claim 1, wherein the retrieving of the contiguously scheduled pSIB segments comprises:
  retrieving the pSIB segments of the pSIB until a pSIB segment with a last segment indicator is retrieved.

9. A method performed by a Radio Network Node, RNN, for transmitting positioning system information to a wireless device, wherein the RNN and the wireless device operate in a wireless communications network, wherein the method comprises:
  determining that positioning assistance data elements will be mapped to positioning System Information Blocks, pSIBs, needed to be separated into multiple segments;
  generate an indication that pSIB is segmented into pSIB segments if a pSIB is segmented into pSIB segments;
  broadcasting the indication that the pSIB is segmented into pSIB segments that are scheduled via contiguous scheduling; and
  scheduling and broadcasting the pSIB segments via contiguous scheduling.

10. The method of claim 9, wherein the method further comprises:
  broadcasting positioning system information broadcast scheduling information, pSI, comprising information about pSIBs being comprised in a SI message.

11. The method of claim 9, wherein the indication is one or more out of:
  a segmentation indication per pSIB indicating whether or not the pSIB is segmented;
  a representation of a total number of segments;
  a representation of a number of segments broadcasted per SI window;
  a pSIB meta data indicating a segment number, which pSIB meta data is obtained by the wireless device by decoding a pSIB; and
  a segment indication comprised in the pSIB.

12. The method of claim 9, wherein the scheduling of the pSIB segments via contiguous scheduling comprises:
  scheduling the pSIB segments of the pSIB to take place more frequently than one pSIB segment of the pSIB per positioning SI period.

13. The method of claim 12, wherein the pSIB segments of the pSIB are scheduled in contiguous SI windows within the positioning SI period.

14. The method of claim 12, wherein multiple pSIB segments of the pSIB are scheduled in one same SI window within the positioning SI period.

15. The method of claim 9, further comprising:
  obtaining one or more positioning assistance data elements from a network node operating in the wireless communications network.

16. A wireless device for receiving positioning system information broadcast scheduling information, pSI, comprising information about positioning System Information Blocks, pSIBs, that are comprised in a System Information, SI, message from a radio network node, wherein the wireless device and the radio network node are configured to operate in a wireless communications network, wherein the wireless device is configured to:
  determine based on the indication that a pSIB is segmented into pSIB segments and on the pSI that the pSIB segments are scheduled via contiguous scheduling;
  monitor scheduled resources and retrieving the contiguously scheduled pSIB segments; and
  decode position system information of the retrieved pSIB segments.

17. The wireless device of claim 16, further configured to:
  decode position system information of the retrieved pSIB segments.

18. The wireless device of claim 16, wherein the indication is one or more out of:
  a segmentation indication per pSIB indicating whether or not the pSIB is segmented;
  a representation of a total number of segments;
  a representation of a number of segments broadcasted per SI window;
  a pSIB meta data indicating a segment number, which pSIB meta data is obtained by the wireless device by decoding a pSIB; and
  a segment indication comprised in the pSIB.

19. The wireless device of claim 16, wherein the wireless device is configured to determine whether or not the pSIB segments are scheduled via contiguous scheduling be further being configured to:
  determine whether or not a scheduling of pSIB segments of the pSIB takes place more frequently than one pSIB segment per positioning SI period.

20. The wireless device of claim 19, wherein the pSIB segments of the pSIB are scheduled in contiguous SI windows within the positioning SI period.

21. The wireless device of claim 19, wherein multiple pSIB segments of the pSIB are scheduled in one same SI window within the positioning SI period.

22. The wireless device of claim 16, wherein the wireless device is configured to retrieve the contiguously scheduled pSIB segments by further being configured to:
retrieve the pSIB segments of the pSIB until a pSIB segment with a last segment indicator is retrieved.

23. The wireless device of claim 17, further being configured to:
use the decoded positioning system information to assist positioning of the wireless device.

24. A Radio Network Node, RNN, for transmitting positioning system information to a wireless device, wherein the RNN and the wireless device operate in a wireless communications network, wherein the RNN is configured to:
determine that positioning assistance data elements will be mapped to positioning System Information Blocks, pSIBs, needed to be separated into multiple segments;
generate an indication that pSIB is segmented into pSIB segments if a pSIB is segmented into pSIB segments;
broadcast the indication that the pSIB is segmented into pSIB segments that are scheduled via contiguous scheduling; and
schedule and broadcast the pSIB segments via contiguous scheduling.

25. The RNN of claim 24, wherein the method further comprises:
broadcast positioning system information broadcast scheduling information, pSI, comprising information about pSIBs being comprised in a SI message.

26. The RNN of claim 24, wherein the indication is one or more out of:
a segmentation indication per pSIB indicating whether or not the pSIB is segmented;
a representation of a total number of segments;
a representation of a number of segments broadcasted per SI window;
a pSIB meta data indicating a segment number, which pSIB meta data is obtained by the wireless device by decoding a pSIB; and
a segment indication comprised in the pSIB.

27. The RNN of claim 24, wherein the RNN is configured to schedule the pSIB segments via contiguous scheduling by further being configured to:
schedule the pSIB segments of the pSIB to take place more frequently than one pSIB segment of the pSIB per positioning SI period.

28. The RNN of claim 27, wherein the pSIB segments of the pSIB are scheduled in contiguous SI windows within the positioning SI period.

29. The RNN of claim 27, wherein multiple pSIB segments of the pSIB are scheduled in one same SI window within the positioning SI period.

30. The RNN of claim 24, further being configured to:
obtain one or more positioning assistance data elements from a network node operating in the wireless communications network.

* * * * *